United States Patent
Liu

(10) Patent No.: US 10,730,489 B2
(45) Date of Patent: *Aug. 4, 2020

(54) BRAKE ASSEMBLY FOR HEIGHT-ADJUSTABLE PATIENT TRANSPORT APPARATUS

(71) Applicant: EVOLUTION TECHNOLOGIES INC., Port Coquitlam (CA)

(72) Inventor: Julian Liu, Port Moody (CA)

(73) Assignee: Evolution Technologies Inc., Port Coquitlam (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/107,895

(22) Filed: Aug. 21, 2018

(65) Prior Publication Data

US 2019/0009758 A1    Jan. 10, 2019

Related U.S. Application Data

(63) Continuation-in-part of application No. 14/966,572, filed on Dec. 11, 2015, now Pat. No. 10,053,062.

(Continued)

(51) Int. Cl.
*B60T 7/10* (2006.01)
*F16C 1/22* (2006.01)
(Continued)

(52) U.S. Cl.
CPC ............ *B60T 7/102* (2013.01); *A61G 1/0287* (2013.01); *A61G 1/048* (2013.01); *A61G 5/10* (2013.01);
(Continued)

(58) Field of Classification Search
CPC .. A61G 5/1037; A61G 5/1002; A61G 1/0287; A61G 5/10; A61G 1/048;
(Continued)

(56) References Cited

U.S. PATENT DOCUMENTS

| | | |
|---|---|---|
| 188,835 A | 3/1877 | Allen |
| 291,351 A | 1/1884 | Jackson |

(Continued)

FOREIGN PATENT DOCUMENTS

| | | |
|---|---|---|
| AT | 214095 B | 3/1961 |
| AT | 242315 B | 9/1965 |

(Continued)

OTHER PUBLICATIONS

Thelma Thibodeau, "Affidavit of Thelma Thibodeau", signed on Nov. 20, 2012, 113 pages, Montreal, Canada, listing the following:.

(Continued)

*Primary Examiner* — Frank B Vanaman
(74) *Attorney, Agent, or Firm* — Berenato & White, LLC

(57) ABSTRACT

A patient transport apparatus includes a height-adjustable assembly having a longitudinal axis, and a brake assembly comprising a brake cable. The brake cable includes an elongate portion extending along the height-adjustable assembly and a slack portion. The patient transport apparatus further includes a brake cable housing coupled to and axially offset from the height-adjustable assembly. The slack portion of the brake cable is enclosed within a hollow interior of the brake cable housing.

20 Claims, 22 Drawing Sheets

Related U.S. Application Data

(60) Provisional application No. 62/213,566, filed on Sep. 2, 2015.

(51) Int. Cl.

| | | |
|---|---|---|
| *A61G 5/10* | (2006.01) | |
| *A61G 1/02* | (2006.01) | |
| *A61H 3/04* | (2006.01) | |
| *B60T 1/04* | (2006.01) | |
| *A61G 1/048* | (2006.01) | |
| *B60T 1/02* | (2006.01) | |
| *B60T 11/04* | (2006.01) | |
| *F16D 125/60* | (2012.01) | |
| *F16D 125/64* | (2012.01) | |

(52) U.S. Cl.
CPC ........... *A61G 5/101* (2013.01); *A61G 5/1002* (2013.01); *A61G 5/1037* (2013.01); *A61H 3/04* (2013.01); *B60T 1/02* (2013.01); *B60T 1/04* (2013.01); *B60T 11/046* (2013.01); *F16C 1/223* (2013.01); *A61G 5/1018* (2013.01); *A61H 2003/046* (2013.01); *A61H 2201/0192* (2013.01); *A61H 2201/164* (2013.01); *A61H 2201/1633* (2013.01); *A61H 2201/5053* (2013.01); *A61H 2203/0431* (2013.01); *B60T 7/104* (2013.01); *F16D 2125/60* (2013.01); *F16D 2125/64* (2013.01)

(58) Field of Classification Search
CPC ............... A61G 5/1018; A61H 3/04; A61H 2201/0192; A61H 2003/046; B60T 7/102; B60T 1/04; F16C 1/223; F16D 2125/60
See application file for complete search history.

(56) References Cited

U.S. PATENT DOCUMENTS

| | | | |
|---|---|---|---|
| 522,117 A | 6/1894 | Humphrey | |
| 534,443 A | 2/1895 | Manguine | |
| 879,803 A | 2/1908 | Vlasak | |
| 1,767,925 A | 6/1930 | Hargreaves | |
| 2,169,860 A | 8/1939 | Von Hoorn | |
| 2,483,307 A | 9/1949 | Wheary, Jr. | |
| 2,631,655 A | 3/1953 | Jannello | |
| 2,656,881 A | 10/1953 | Hamilton | |
| 2,681,809 A | 6/1954 | Hamill | |
| 2,732,047 A | 1/1956 | Finkelstein | |
| 2,864,466 A | 12/1958 | Taylor | |
| 2,866,495 A | 12/1958 | Diehl et al. | |
| 2,937,248 A | 5/1960 | Michetti | |
| 2,987,149 A | 6/1961 | Finkelstein | |
| 3,018,506 A | 1/1962 | Haydock | |
| 3,061,049 A | 10/1962 | Bramley | |
| 3,109,899 A | 11/1963 | Pastene | |
| 3,142,351 A | 7/1964 | Green | |
| 3,194,577 A | 7/1965 | Berlin | |
| 3,268,965 A | 8/1966 | Arthur | |
| 3,288,250 A | 11/1966 | Oja et al. | |
| 3,376,400 A | 4/1968 | Batt et al. | |
| 3,409,105 A | 11/1968 | Clinton | |
| 3,690,652 A | 9/1972 | Schneider | |
| 3,692,155 A | 9/1972 | Laurita | |
| 3,890,668 A | 6/1975 | Stosberg et al. | |
| 3,903,944 A | 9/1975 | Montgomery et al. | |
| 3,927,727 A | 12/1975 | Hanagan | |
| 3,969,964 A | 7/1976 | George et al. | |
| 4,029,279 A | 6/1977 | Nakatani | |
| 4,029,311 A | 6/1977 | Chanslor et al. | |
| 4,056,115 A | 11/1977 | Thomas | |
| 4,087,141 A | 5/1978 | Roberts | |
| 4,116,464 A | 9/1978 | Haley | |
| 4,149,721 A | 4/1979 | Strickland | |
| 4,184,618 A | 1/1980 | Jones | |
| 4,185,936 A | 1/1980 | Takahashi | |
| 4,261,561 A | 4/1981 | Ilon | |
| 4,286,401 A | 9/1981 | Pachmayr et al. | |
| 4,325,561 A | 4/1982 | Lynn | |
| 4,371,183 A | 2/1983 | Dion | |
| 4,384,713 A | 5/1983 | Deutsch et al. | |
| 4,404,822 A | 9/1983 | Green | |
| 4,414,702 A | 11/1983 | Neumann | |
| 4,415,198 A | 11/1983 | Brearley | |
| 4,449,750 A | 5/1984 | Pultman | |
| 4,460,188 A | 7/1984 | Maloof | |
| 4,462,138 A | 7/1984 | Black | |
| 4,477,098 A | 10/1984 | Minnebraker | |
| 4,493,488 A | 1/1985 | Panaia et al. | |
| 4,494,271 A | 1/1985 | Perlin et al. | |
| 4,509,662 A | 4/1985 | Weiss | |
| 4,518,817 A * | 5/1985 | Kirby | H02G 9/10 |
| | | | 137/356 |
| 4,570,370 A | 2/1986 | Smith et al. | |
| 4,572,409 A | 2/1986 | Finnegan | |
| 4,596,484 A | 6/1986 | Nakatani | |
| 4,659,099 A | 4/1987 | Malone | |
| 4,669,146 A | 6/1987 | Saito et al. | |
| 4,676,416 A | 6/1987 | Harmon | |
| 4,722,114 A | 2/1988 | Neumann | |
| 4,740,010 A | 4/1988 | Moskovitz | |
| 4,761,092 A | 8/1988 | Nakatani | |
| 4,765,644 A | 8/1988 | Bell | |
| 4,800,911 A | 1/1989 | Endres et al. | |
| 4,800,991 A | 1/1989 | Miller | |
| 4,830,035 A | 5/1989 | Liu | |
| 4,853,500 A | 8/1989 | Tydlacka | |
| 4,856,123 A | 8/1989 | Henderson et al. | |
| 4,883,317 A | 11/1989 | Davenport | |
| 4,890,355 A | 1/1990 | Schulten | |
| 4,907,794 A | 3/1990 | Rose | |
| 4,907,839 A | 3/1990 | Rose et al. | |
| 4,913,452 A | 4/1990 | Zun | |
| 4,930,697 A | 6/1990 | Takanashi et al. | |
| 4,962,781 A | 10/1990 | Kanbar | |
| 4,974,760 A | 12/1990 | Miller | |
| 5,012,963 A | 5/1991 | Rosenbaum | |
| 5,020,560 A | 6/1991 | Turbeville | |
| 5,046,748 A | 9/1991 | Oat-Judge | |
| 5,052,075 A | 10/1991 | Harris | |
| 5,103,530 A | 4/1992 | Andrisin, III et al. | |
| 5,109,569 A | 5/1992 | Shaw | |
| 5,125,685 A | 6/1992 | Takahashi et al. | |
| 5,158,313 A | 10/1992 | Becker | |
| 5,167,048 A | 12/1992 | Geiger et al. | |
| 5,188,139 A | 2/1993 | Garelick | |
| 5,268,986 A | 12/1993 | Kakii et al. | |
| 5,269,157 A | 12/1993 | Ciminelli et al. | |
| 5,279,180 A | 1/1994 | Henriksson | |
| 5,293,965 A | 3/1994 | Nagano | |
| 5,294,027 A | 3/1994 | Plastina | |
| 5,297,443 A * | 3/1994 | Wentz | B25J 15/12 |
| | | | 74/490.04 |
| 5,348,336 A | 9/1994 | Fernie et al. | |
| 5,353,824 A | 10/1994 | Woods et al. | |
| 5,356,237 A | 10/1994 | Sung | |
| 5,380,034 A | 1/1995 | Wilson | |
| 2,710,084 A | 6/1995 | Braverman | |
| 5,429,377 A | 7/1995 | Duer | |
| 5,433,235 A | 7/1995 | Miric et al. | |
| 5,465,745 A | 11/1995 | Davis | |
| 5,465,986 A | 11/1995 | MacRae | |
| 5,475,896 A | 12/1995 | Wang | |
| 5,482,189 A | 1/1996 | Dentler et al. | |
| 5,499,697 A | 3/1996 | Trimble et al. | |
| 5,513,789 A | 5/1996 | Woods et al. | |
| 5,527,096 A | 6/1996 | Shimer | |
| 5,531,238 A | 7/1996 | Azzarelli et al. | |
| 5,551,413 A | 9/1996 | Walk | |
| 5,593,461 A | 1/1997 | Reppert et al. | |
| 5,594,974 A | 1/1997 | Wattron et al. | |
| 5,605,345 A | 2/1997 | Erfurth et al. | |
| 5,621,997 A | 4/1997 | Pearce | |

(56) References Cited

U.S. PATENT DOCUMENTS

| | | |
|---|---|---|
| 5,622,404 A | 4/1997 | Menne |
| 5,632,362 A | 5/1997 | Leitner |
| 5,639,052 A | 6/1997 | Sauve |
| 5,640,741 A | 6/1997 | Yano |
| 5,662,342 A | 9/1997 | Basharat |
| 5,687,984 A | 11/1997 | Samuel |
| 5,692,762 A | 12/1997 | Obitts |
| 5,722,717 A | 3/1998 | Rettenberger |
| 5,772,234 A | 6/1998 | Luo |
| 5,774,936 A | 7/1998 | Vetter |
| 5,775,352 A | 7/1998 | Obitts |
| 5,813,582 A | 9/1998 | Wright |
| 5,816,650 A | 10/1998 | Lucas, Jr. |
| 5,865,065 A | 2/1999 | Chiu |
| 5,896,779 A | 4/1999 | Biersteker et al. |
| 5,901,891 A | 5/1999 | Douglass |
| 5,915,712 A | 6/1999 | Stephenson et al. |
| 5,927,441 A | 7/1999 | Luo |
| 5,953,962 A | 9/1999 | Hewson |
| 5,954,161 A | 9/1999 | Lee |
| 6,032,765 A | 3/2000 | Hsi-Chia |
| 6,047,439 A | 4/2000 | Stearn |
| 6,079,290 A | 6/2000 | Li |
| 6,079,894 A | 6/2000 | Obitts |
| 6,082,468 A | 7/2000 | Pusateri et al. |
| 6,098,487 A | 8/2000 | Chien |
| 6,099,002 A | 8/2000 | Uchiyama |
| 6,112,446 A | 9/2000 | Forster et al. |
| 6,135,475 A | 10/2000 | Brown et al. |
| 6,142,526 A | 11/2000 | Katz |
| 6,161,896 A | 12/2000 | Johnson et al. |
| 6,164,154 A | 12/2000 | Munger et al. |
| 6,189,914 B1 | 2/2001 | Worth et al. |
| 6,192,772 B1 | 2/2001 | Huang |
| 6,196,562 B1 | 3/2001 | Zhuang |
| 6,202,502 B1 | 3/2001 | Chung-Che |
| 6,216,825 B1 | 4/2001 | Hung |
| 6,247,882 B1 | 6/2001 | Huang |
| 6,283,484 B1 | 9/2001 | Malmstrom |
| 6,296,261 B1 | 10/2001 | Degoma |
| 6,296,263 B1 | 10/2001 | Schultz et al. |
| 6,311,708 B1 | 11/2001 | Howle |
| 6,318,392 B1 | 11/2001 | Chen |
| 6,338,355 B1 | 1/2002 | Cheng |
| 6,338,493 B1 | 1/2002 | Wohlgemuth et al. |
| 6,340,168 B1 | 1/2002 | Woleen |
| 6,347,777 B1 | 2/2002 | Webber et al. |
| 6,354,619 B1 | 3/2002 | Kim |
| 6,364,070 B1 | 4/2002 | Chen |
| 6,371,142 B1 | 4/2002 | Battiston |
| 6,378,663 B1 | 4/2002 | Lee |
| 6,378,883 B1 | 4/2002 | Epstein |
| 6,386,575 B1 | 5/2002 | Turner |
| 6,401,321 B2 | 6/2002 | Carey et al. |
| 6,409,196 B1 | 6/2002 | McFarland |
| 6,442,797 B1 | 9/2002 | Yang et al. |
| 6,467,785 B2 | 10/2002 | Toppses |
| 6,491,318 B1 | 12/2002 | Galt et al. |
| 6,494,469 B1 | 12/2002 | Hara et al. |
| 6,502,280 B2 | 1/2003 | Looker |
| 6,527,136 B1 | 3/2003 | Sabounjian |
| 6,584,641 B1 | 7/2003 | Milbredt |
| 6,604,789 B1 | 8/2003 | Downing |
| 6,622,587 B1 | 9/2003 | Wu |
| 6,647,825 B1 | 11/2003 | Lin |
| 6,651,994 B2 | 11/2003 | Hallgrimsson et al. |
| 6,655,702 B2 | 12/2003 | Senger |
| 6,659,478 B2 | 12/2003 | Hallgrimsson et al. |
| 6,688,633 B2 | 2/2004 | Van't Schip |
| 6,754,936 B2 | 6/2004 | Erenaga |
| 6,755,285 B1 | 6/2004 | Wu |
| 6,769,701 B1 | 8/2004 | Clausen |
| 6,810,560 B1 | 11/2004 | Tsai |
| 6,817,066 B1 | 11/2004 | Williams et al. |
| 6,837,503 B2 | 1/2005 | Chen et al. |
| D501,432 S | 2/2005 | Moller |
| 6,877,519 B2 | 4/2005 | Fink |
| 6,886,216 B2 | 5/2005 | Graham et al. |
| 6,886,575 B2 | 5/2005 | Diamond |
| 6,889,998 B2 | 5/2005 | Sterns et al. |
| 7,052,030 B2 | 5/2006 | Serhan |
| 7,090,239 B2 | 8/2006 | Yoshie et al. |
| 7,108,004 B2 | 9/2006 | Cowie et al. |
| 7,182,179 B2 | 2/2007 | Tolfsen |
| 7,211,744 B2 | 5/2007 | Jorgensen |
| 7,219,906 B2 | 5/2007 | Hallgrimsson et al. |
| 7,231,689 B2 | 6/2007 | Scheiber et al. |
| 7,278,436 B2 | 10/2007 | Gale et al. |
| 7,290,742 B2 | 11/2007 | Wang |
| 7,306,246 B2 | 12/2007 | Gale |
| 7,353,566 B2 | 4/2008 | Scheiber et al. |
| 7,377,285 B2 | 5/2008 | Karasin et al. |
| 7,383,611 B2 | 6/2008 | Foster |
| 7,384,058 B2 | 6/2008 | Munsey et al. |
| 7,410,179 B2 | 8/2008 | Lonkvist |
| 7,422,550 B1 | 9/2008 | Pinero et al. |
| 7,445,216 B1 | 11/2008 | Chou |
| 7,494,138 B2 | 2/2009 | Graham |
| 7,500,689 B2 | 3/2009 | Pasternak et al. |
| 7,559,560 B2 | 7/2009 | Li |
| 7,587,852 B1 | 9/2009 | Harms |
| 7,775,547 B2 | 8/2010 | Dotsey et al. |
| 7,828,305 B2 | 11/2010 | Meyers et al. |
| 7,837,205 B2 | 11/2010 | Simard |
| 7,841,257 B2 | 11/2010 | Tomandl |
| 7,926,834 B2 | 4/2011 | Willis |
| 7,980,415 B2 | 7/2011 | Crawley |
| 7,984,724 B1 | 7/2011 | Eberle |
| 8,002,363 B2 | 8/2011 | Cheng |
| 8,020,679 B2 | 9/2011 | Wu |
| 8,083,239 B2 | 12/2011 | Liu |
| 8,087,127 B2 | 1/2012 | Dayt |
| 8,157,273 B2 | 4/2012 | Bar-Lev |
| 8,167,351 B2 | 5/2012 | Plowman |
| 8,251,380 B2 | 8/2012 | Liu |
| 8,251,391 B2 | 8/2012 | Kohler et al. |
| 8,313,066 B2 | 11/2012 | Hampton et al. |
| 8,424,215 B2 | 4/2013 | Quintiliani et al. |
| 8,434,171 B2 | 5/2013 | Wang |
| 8,448,960 B2 | 5/2013 | Liu |
| 8,505,936 B2 | 8/2013 | Liu |
| 8,511,694 B2 | 8/2013 | Bradshaw et al. |
| 8,517,399 B2 | 8/2013 | Liu |
| 8,573,613 B2 | 11/2013 | Liu |
| 8,602,424 B2 | 12/2013 | Liu |
| D697,163 S | 1/2014 | Bietsch |
| 8,801,073 B1 | 8/2014 | Gray, Jr. et al. |
| 8,857,093 B2 | 10/2014 | Hogue |
| 8,864,151 B1 | 10/2014 | Liu |
| 8,936,256 B2 | 1/2015 | Liu |
| 9,022,397 B1 | 5/2015 | Prettyman |
| 9,022,413 B2 | 5/2015 | Liu |
| 9,221,433 B2 | 12/2015 | Dunlap |
| 9,339,432 B2 | 5/2016 | Liu et al. |
| 2002/0079663 A1 | 6/2002 | Hallgrimsson et al. |
| 2002/0093178 A1 | 7/2002 | Turner et al. |
| 2002/0140196 A1 | 10/2002 | Crouch et al. |
| 2003/0010368 A1 | 1/2003 | Mackinnon |
| 2003/0226584 A1 | 12/2003 | Serhan |
| 2004/0094999 A1 | 5/2004 | Volotsenko |
| 2004/0111830 A1 | 6/2004 | Cooper et al. |
| 2005/0001398 A1 | 1/2005 | Serhan |
| 2005/0057021 A1 | 3/2005 | Miyoshi |
| 2005/0067804 A1 | 3/2005 | Tolfsen |
| 2005/0121481 A1 | 6/2005 | Chiu |
| 2005/0156395 A1 | 7/2005 | Bohn |
| 2005/0156404 A1 | 7/2005 | Lauren et al. |
| 2005/0211285 A1 | 9/2005 | Cowie et al. |
| 2005/0250605 A1 | 11/2005 | Moore et al. |
| 2006/0059656 A1 | 3/2006 | Hackett |
| 2006/0156511 A1 | 7/2006 | Li |
| 2007/0170699 A1 | 7/2007 | Li et al. |
| 2007/0199586 A1 | 8/2007 | Cheng |
| 2007/0227570 A1 | 10/2007 | Gale et al. |

(56) References Cited

U.S. PATENT DOCUMENTS

| | | |
|---|---|---|
| 2007/0235067 A1 | 10/2007 | Gale et al. |
| 2007/0267054 A1 | 11/2007 | Meyers et al. |
| 2007/0267453 A1 | 11/2007 | Carroll |
| 2007/0278271 A1 | 12/2007 | Koren |
| 2007/0278768 A1 | 12/2007 | Lynam |
| 2007/0283990 A1 | 12/2007 | Fernandez et al. |
| 2008/0042476 A1 | 2/2008 | Hei et al. |
| 2008/0079230 A1 | 4/2008 | Graham |
| 2008/0111349 A1 | 5/2008 | Willis |
| 2008/0121258 A1 | 5/2008 | Lin |
| 2008/0129016 A1 | 6/2008 | Willis |
| 2008/0174084 A1 | 7/2008 | Gee |
| 2009/0033052 A1 | 2/2009 | Bradshaw et al. |
| 2009/0206578 A1 | 8/2009 | Pizmony et al. |
| 2010/0083994 A1 | 4/2010 | Liu |
| 2010/0301574 A1 | 12/2010 | Derks |
| 2011/0030749 A1 | 2/2011 | Miller |
| 2011/0146027 A1 | 6/2011 | Tsai |
| 2011/0173861 A1 | 7/2011 | Roth |
| 2011/0187067 A1 | 8/2011 | Staggs |
| 2011/0241303 A1 | 10/2011 | Campbell |
| 2011/0308338 A1* | 12/2011 | Schluckebier ...... F16H 19/0645 74/89.2 |
| 2012/0043739 A1 | 2/2012 | Lui |
| 2012/0084940 A1 | 4/2012 | Tsai |
| 2012/0104710 A1 | 5/2012 | Liu |
| 2012/0133106 A1 | 5/2012 | Liu |
| 2012/0205882 A1 | 8/2012 | Staggs |
| 2012/0229289 A1* | 9/2012 | Coon ................... A61M 39/08 340/652 |
| 2012/0280463 A1 | 11/2012 | Liu |
| 2012/0299272 A1 | 11/2012 | Liu |
| 2013/0062864 A1 | 3/2013 | Huang |
| 2013/0168947 A1 | 7/2013 | Offord |
| 2013/0187356 A1 | 7/2013 | Hazeleger |
| 2013/0264787 A1 | 10/2013 | Cheng et al. |
| 2013/0320640 A1 | 12/2013 | Liu |
| 2014/0125037 A1 | 5/2014 | Andersen |
| 2014/0175841 A1 | 6/2014 | Liu |
| 2014/0284891 A1 | 9/2014 | Liu |
| 2014/0305249 A1 | 10/2014 | Liu |
| 2014/0312586 A1 | 10/2014 | Cheng et al. |
| 2014/0333040 A1 | 11/2014 | Liu |
| 2015/0048582 A1 | 2/2015 | Liu |

FOREIGN PATENT DOCUMENTS

| | | |
|---|---|---|
| CA | 2137650 A1 | 6/1995 |
| CA | 2285305 A1 | 10/1998 |
| CA | 2352801 A1 | 6/2000 |
| CA | 2329485 A1 | 6/2002 |
| CA | 2513558 A1 | 9/2004 |
| CA | 2492392 A1 | 9/2005 |
| CN | 2551232 Y | 5/2003 |
| CN | 1022512 C1 | 8/2004 |
| CN | 202163565 U | 3/2012 |
| CN | 202490148 U | 10/2012 |
| CN | 203544058 U | 4/2014 |
| DE | 4328875 C1 | 2/1995 |
| DE | 29818710 U1 | 9/1999 |
| DE | 202004010326 U1 | 11/2004 |
| DE | 102010031954 A1 | 1/2012 |
| DE | 202011003227 U1 | 2/2012 |
| DE | 102013217906 B3 | 12/2014 |
| EP | 1092411 A2 | 4/2001 |
| EP | 2090276 A1 | 8/2009 |
| EP | 2522404 A1 | 11/2012 |
| GB | 191223483 A | 5/1913 |
| GB | 3B365901 A | 1/1932 |
| GB | 3B984025 A | 2/1965 |
| GB | 1396227 A | 6/1975 |
| GB | 2180508 A | 4/1987 |
| JP | H05303018 A | 11/1993 |
| JP | H09123915 A | 5/1997 |
| JP | H10291401 A | 11/1998 |
| WO | WO1992006661 A1 | 4/1992 |
| WO | WO1998051557 A1 | 11/1998 |
| WO | WO2002022070 A2 | 3/2002 |
| WO | WO2004073578 A1 | 9/2004 |
| WO | WO2006112779 A1 | 10/2006 |
| WO | WO2008019454 A1 | 2/2008 |

OTHER PUBLICATIONS

A web printout screen shot of http://doclibrary.invacare.fr/Office/Europe/Marketing/MktDocIE.nsf/MListeProduct?openform&bu=3000&subgroup=3300&family=3410 (exhibit TT-5).

... showing the words "Jazz Sales Brochure" besides a listing "May 1, 2008", which allegedly eventually links to "Dolomite Jazz Operating Instructions" shown in exhibit TT-7(http://doclibrary.invacare.fr/Office/Europe/Marketing/MktDocIE.nsf/VALLMDocument/BCCFF695FBFFA571C12575BA0056AB70/$File/OPERATING%20INSTRUCTIONS%20JAZZ.pdf).

A web printout screen shot of http://web.archive.org/web/20080512005035/http://www.handicat.com/at-num-18827.html (exhibits TT-16, 17) dated May 12, 2008.

A web printout screen shot of http://web.archive.org/web/20080512005035/http://www.handicat.com/at-num-18827.html (translated) (exhibit TT-18) dated May 12, 2008.

A web printout screen shot of http://doclibrary.invacare.fr/Office/Europe/Marketing/MktDocCor.nsf/MListeDocument?openform&bu=3000&subgroup=3300&family=34108,product=65_JAZ showing the words "TUV Certificate 2007—Jazz" (exhibit T-23).

Pruefprotokoll/test protocol Rollatoren Jul. 2005, signed on Oct. 30, 2007 (exhibit TT-25), Hannover, Germany.

A web printout screen shot of http://web.archive.org/web/20080214151414/http://www.dolomite.biz/ (exhibit TT-32) dated Feb. 14, 2008.

A web printout screen shot of http://web.archive.org/web/20080608193327/http://www.dolomite.biz/dolomite/products.php (exhibit TT-33) dated Feb. 14, 2008.

A web printout screen shot of http://web.archive.org/web/20080919040758/http://www.dolomite.biz/dolomite/dolomite-lazz.php (exhibit TT-34) dated Feb. 14, 2008.

A web screen shot printout from doclibrary.invacarefr . . .(?) dated Aug. 6, 2013, in which adjacent to the heading "Dolomite Jazz", a "Jazz Sales Brochure" is listed as having a "start date of validity" of May 1, 2008, and in which a "Jazz spare parts list" is listed as having a "start date of validity" of May 1, 2008.

A web screen shot printout of: web.archive.org/web/20080508194602/http://www.dolomite.biz/, dated May 8, 2008.

Caster, http://en.wikipedia.org/wiki/Caster, dated Oct. 20, 2010.

International Search Report and Written Opinion for PCT/CA2015/050058, dated May 1, 2015.

Merriam-Webster Dictionary, Arch—Definition and More from the Free Merriam-Webster Dictionary, dated Mar. 26, 2013.

Two web screen shot printouts from handicat.com/classif4-num-03-09-06.html, dated Aug. 6, 2013, in which adjacent to a "Dolomite Jazz" heading, the words "Crée le . . .May 7, 2008—Modifiée: Jul. 24, 2013", which may mean "Created on May 7, 2008—Modified: Jul. 24, 2013".

Two web screen shot printouts from doclibrary.invacare.fr . . .(?) dated Aug. 6, 2013, in which adjacent to a "Dolomite Jazz" heading, "2007" is set out by a "TUV certificate".

International Search Report and Written Opinion for PCT/CA2016/050978, dated Oct. 17, 2016.

International Search Report and Written Opinion for PCT/CA2016/051017, dated Oct. 26, 2016.

International Search Report and Written Opinion for PCT/CA2016/050371, dated Jun. 9, 2016.

* cited by examiner

BRAKE ASSEMBLY FOR HEIGHT-ADJUSTABLE PATIENT TRANSPORT APPARATUS

CROSS REFERENCE TO RELATED APPLICATION

This application is a continuation-in-part of U.S. patent application Ser. No. 14/966,572, now U.S. Pat. No. 10,053,062, filed in the United States Patent and Trademark Office on Dec. 11, 2015, based on provisional application Ser. No. 62/213,566 filed Sep. 2, 2015, the disclosures of which are incorporated herein by reference and to which priority is claimed.

BACKGROUND OF THE INVENTION

Field of the Invention

There is provided a brake assembly. In particular, there is provided a brake assembly for height-adjustable patient transport apparatus.

Description of the Related Art

U.S. Pat. No. 4,325,561 to Lynn discloses a transport table with telescoping members 38 and 40 as seen in FIG. 1 thereof. The table includes wheels 44 with brakes 59 which are actuated via cable wires 57 and 61. In order to allow the telescoping members 38 and 40 to extend between an extended position and a retracted position out of the rear legs 34 and 36, the cable wires 57 and 61 are provided with slack so as to not interfere with this operation. This length or slack is provided by looping the cable wires 57 and 61 at the lower end of the telescoping members 38 and 40.

However, the above system may result in cable wires that are susceptible to being entangled with other objects or a person's clothing, for example. In such cases, the wire may be subject to premature wear and damage. Also, such a configuration of cable wires may inhibit safe operation of the transport table by causing persons adjacent thereto to become entangled and/or fall down, for example.

International Patent Publication Number WO 2004/073578 to Lonkvist to discloses a wheeled walker. The walker includes a frame member 2 having a lower end 3, a handle support rod 4 having an upper end 5, and a brake-control means 6 arranged at the upper end of the handle support rod. The brake-control means is movable between a neutral position and a brake-application position. The walker includes a wheel 7 located at the lower end 3 of the frame member. The distance between the wheel 7 and the brake-control means 6 is changeable. The walker includes a brake element 8 located adjacent the wheel 7. An upper force-transmission member 9 is connected to the brake-control means 6 and disposed within the frame member 2. A lower force-transmission member 10 is connected to the brake element 8 and disposed within the frame member 2. There is also provided a coupling means 11 for coupling-together the upper and the lower force-transmission members 9, 10. The upper force-transmission member and the lower force-transmission member are arranged to move freely relative to one another when the brake-control means 6 assumes its neutral position. The upper force-transmission member 9 and the lower force-transmission member 10 are arranged to be interconnected by means of the coupling means 11 when the brake-control means 6 leaves the neutral position in response to which braking force is transferred to the brake element 8.

However, such a system may be complicated, require many parts and thus be relative expensive to manufacture, for example.

There may accordingly be a need for an improved brake cable assembly for height-adjustable patient transport apparatus.

BRIEF SUMMARY OF INVENTION

According to a first aspect, there is provided a patient transport apparatus. The apparatus includes a height-adjustable assembly having a longitudinal axis. The apparatus includes a brake cable. The brake cable has an elongate portion extending along the height-adjustable assembly and has a slack portion. The apparatus includes a brake cable housing coupled to and axially offset from the height-adjustable assembly. The slack portion of the brake cable is enclosed within a hollow interior of the brake cable housing.

According to a second aspect, there is provided a patient transport apparatus. The apparatus includes a height-adjustable assembly having a longitudinal axis. The apparatus includes a brake cable. The brake cable has an elongate portion extending along the height-adjustable assembly in parallel with said longitudinal axis. The brake cable has a slack portion that extends laterally outwards from the height-adjustable assembly relative to the longitudinal axis of the height-adjustable assembly. The apparatus includes a brake cable housing operatively connected to the height-adjustable assembly and shaped to receive and enclose the slack portion of the brake cable.

According to a third aspect, there is provided a brake cable housing for a patient transport apparatus. The brake cable housing has a rear through which excess portions of a brake cable enter and exit. The brake cable forms an enlarged loop shape within the brake cable housing when the apparatus is in a retracted position. The brake cable forms a reduced loop shape spanning a planar area that is less than that of the enlarged loop shape when the apparatus is in an extended position.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
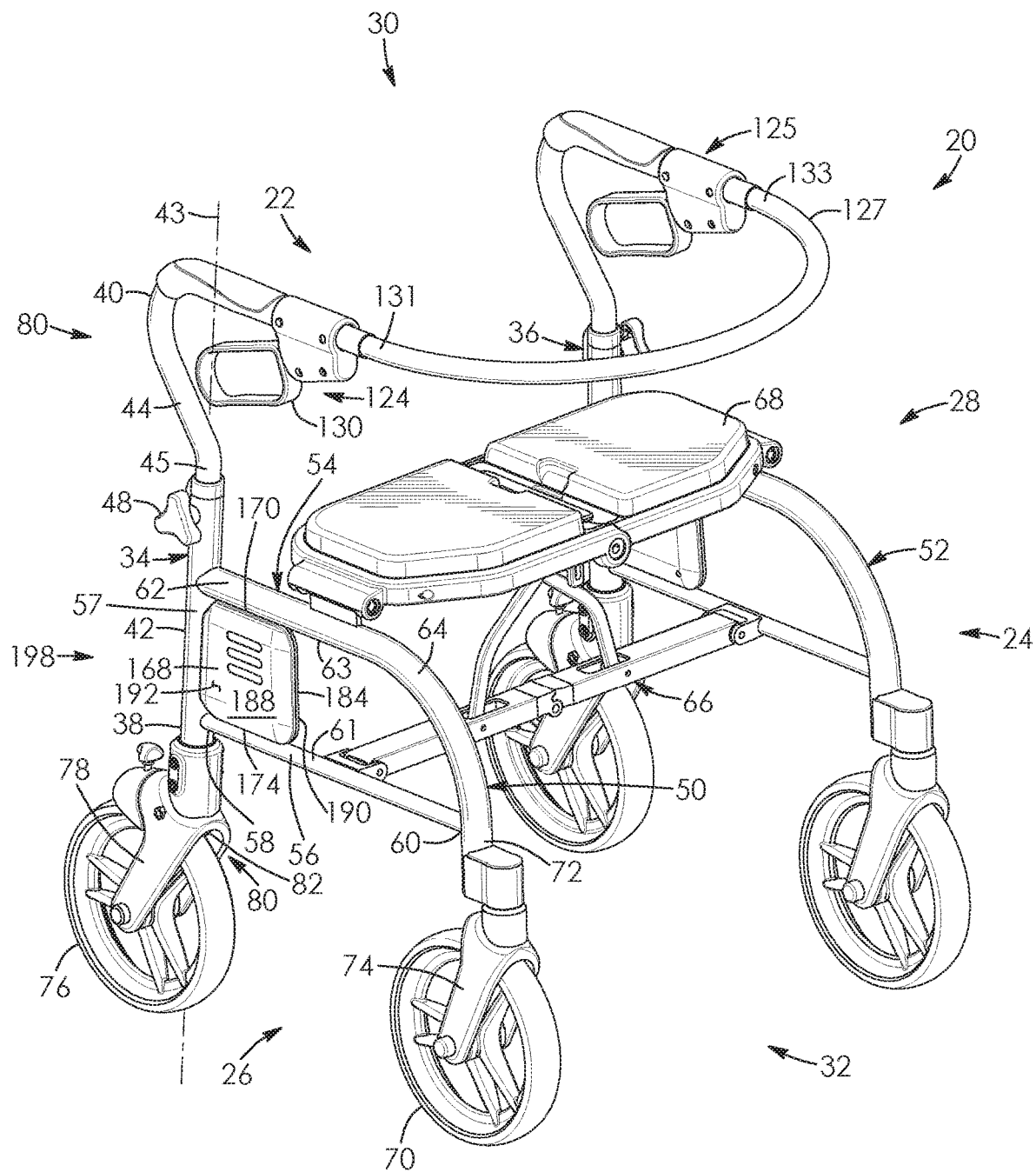
FIG. 1 is a top, front, left side perspective view of a patient transport apparatus according to a first aspect, the patient transport apparatus comprising a walker apparatus that includes a folding mechanism, a seat assembly, and a brake assembly, the brake assembly including a pair of spaced-apart brake cable housings.
Figure 2:
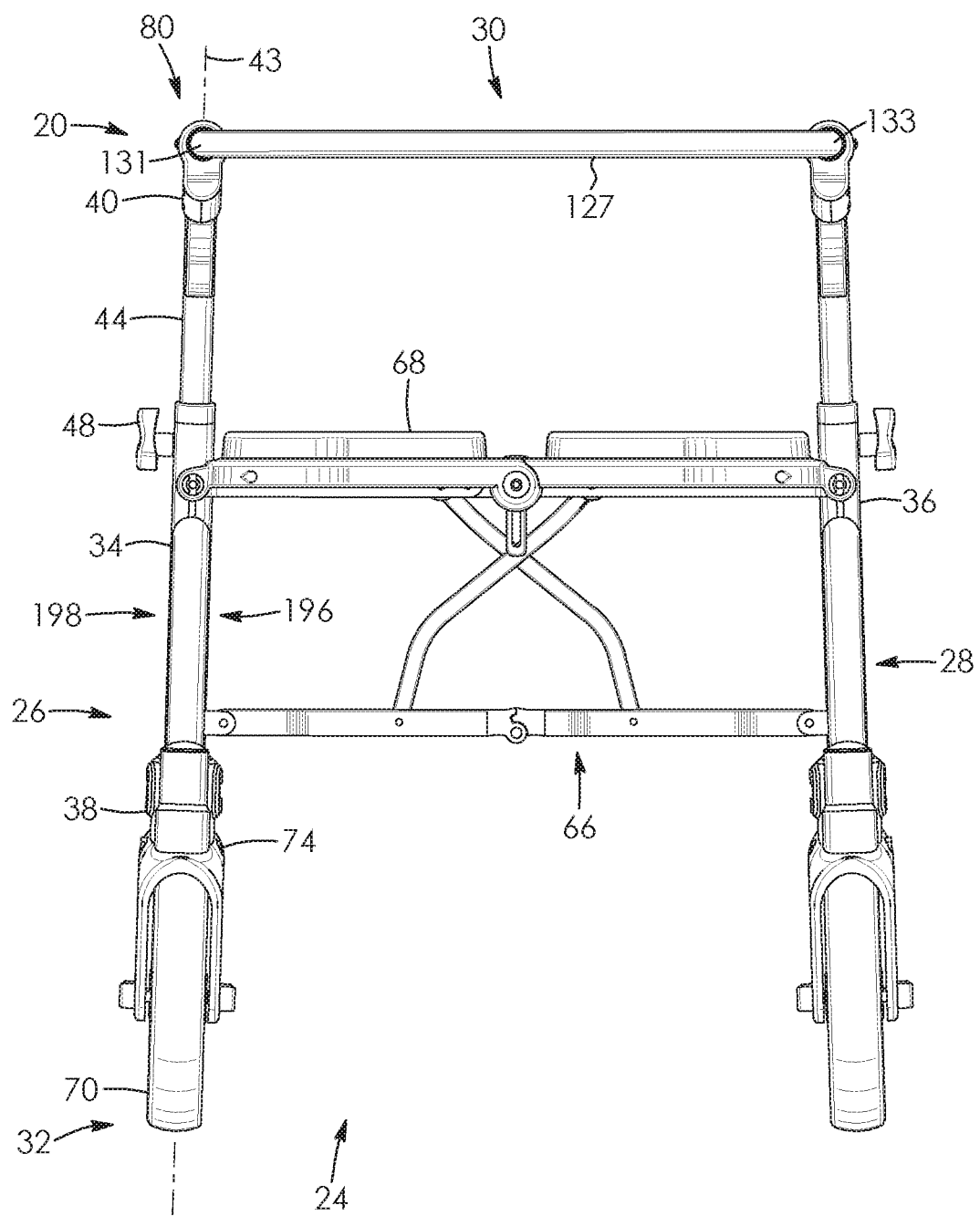
FIG. 2 is a front elevation view thereof.
Figure 3:
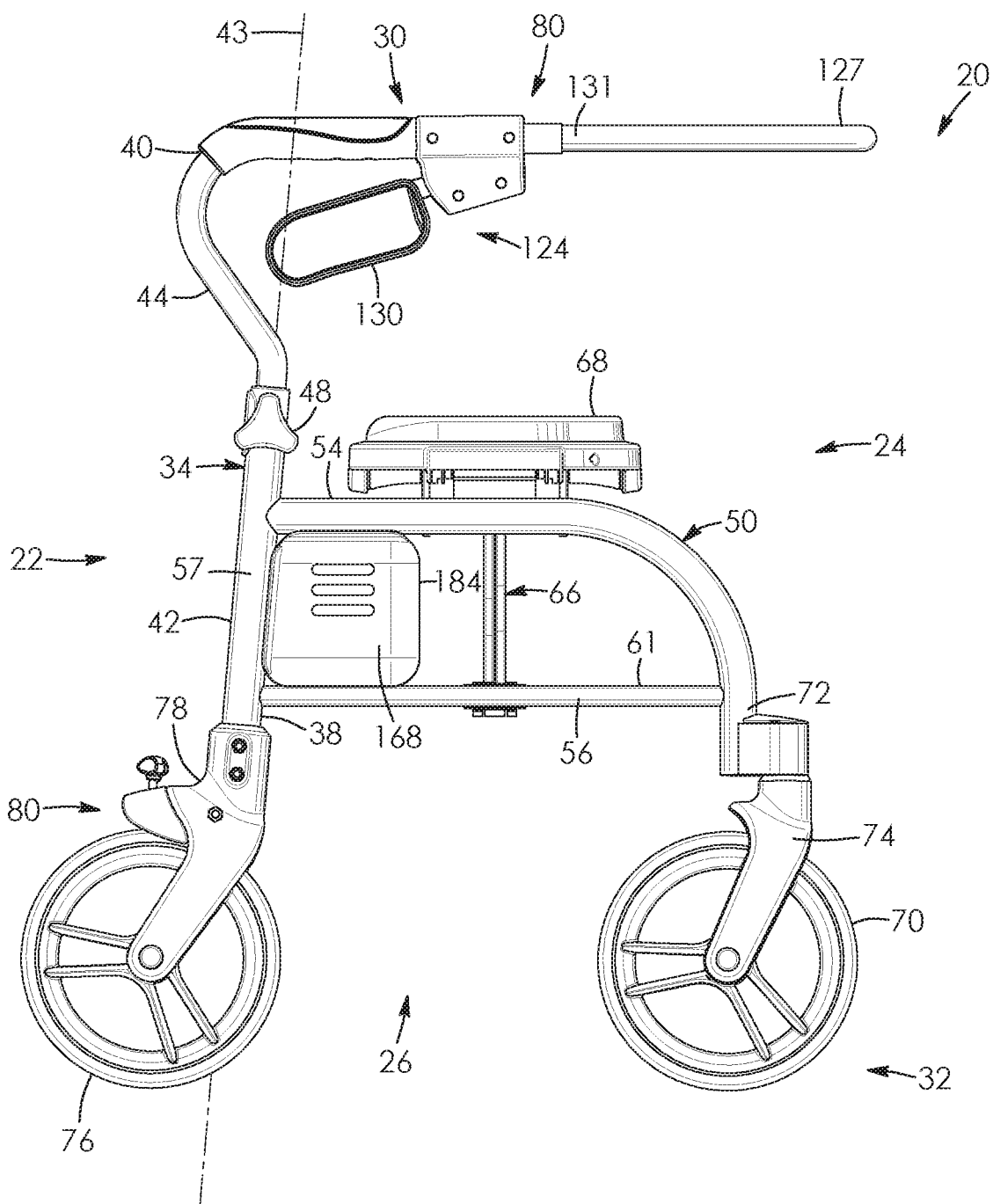
FIG. 3 is a left side elevation view thereof, the right side elevation view of the walker apparatus being a mirror image thereof.

Referring to the drawings and first to FIG. 1, there is shown a height-adjustable patient transport apparatus. The apparatus may also be referred to as a travel-assistance apparatus and in this example comprises a height-adjustable walker apparatus 20. The apparatus has a rear 22 and a front 24 best seen in FIG. 2. As seen in FIG. 1, the apparatus 20 has a pair of spaced-apart sides 26 and 28, a top 30 and a bottom 32 which is spaced-apart from the top. The rear 22 and front 24 of the walker apparatus extend between the sides 26 and 28 thereof and the top 30 and bottom 32 thereof. The top and bottom of the apparatus also extend between the sides 26 and 28 thereof.

Referring to FIG. 1, the walker apparatus 20 includes a pair of spaced-apart, height/length-adjustable assemblies 34 and 36 aligning with respective ones of the sides 26 and 28 thereof. Each of the upright assemblies has a lower end and an upper end, as seen by lower end 38 and upper end 40 for assembly 34. Each of the upright assemblies is height adjustable in this example and telescopic, with a lower outer elongate member or tube, and an upper inner elongate member or tube shaped to fit within the lower tube. This is seen by outer tube 42 and inner tube 44 for assembly 34. As seen in FIG. 1, each of the assemblies 34 has a longitudinal axis 43 along which portion 57 of the outer tube 42 and the telescoping portion 45 of the inner tube 44 extend.

Figure 15:
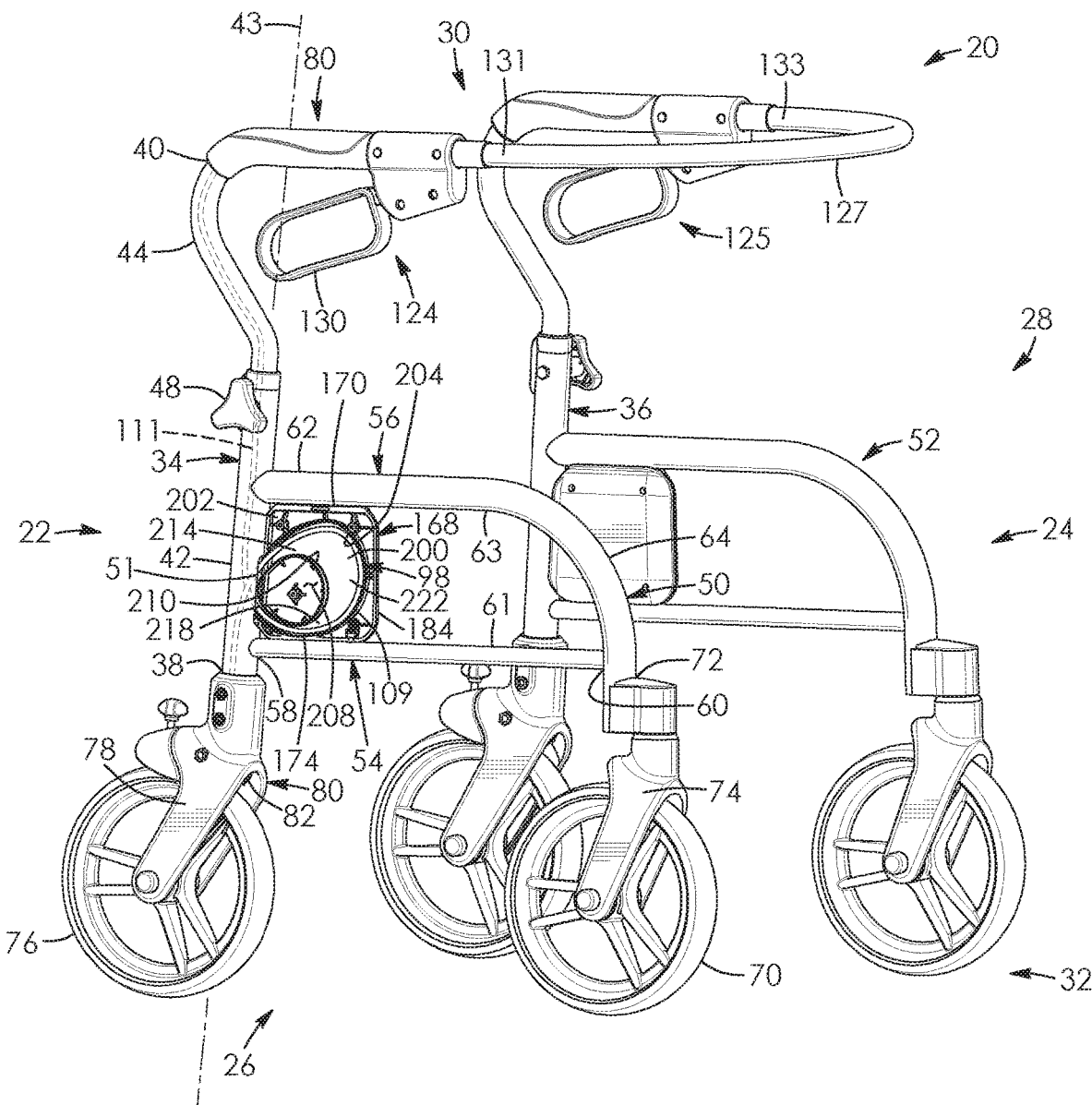
FIG. 15 is a left side, front perspective view of the walker apparatus of FIG. 14, with the folding mechanism and seat assembly not being shown, with pairs of telescoping tubes of the walker apparatus being shown in a retracted position and a brake cable for one of the pairs of telescoping tubes, the brake cable being shown in ghost.
Figure 16:
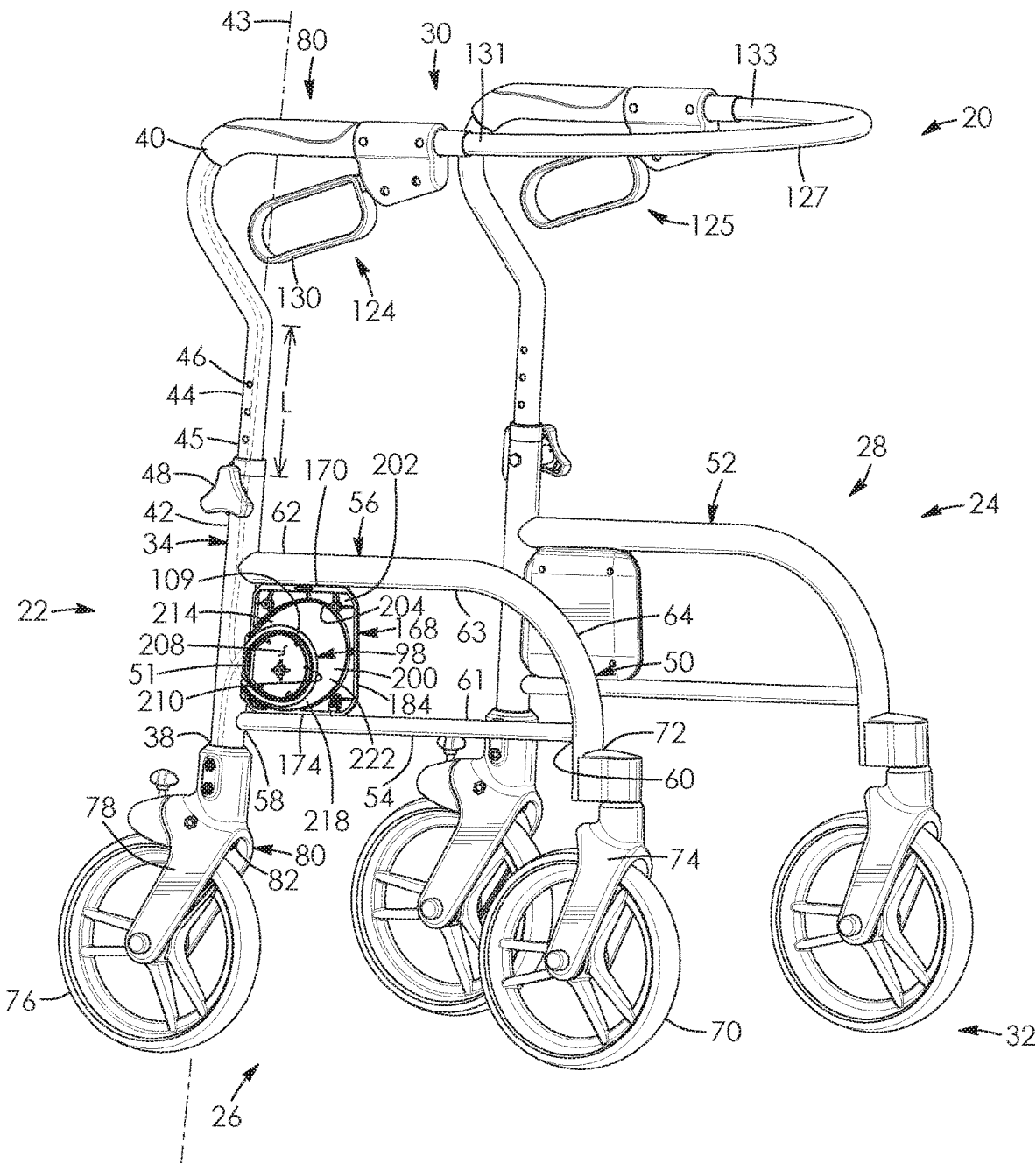
FIG. 16 is a left side, front perspective view similar to FIG. 15 of the walker apparatus of FIG. 15, with the folding mechanism and seat assembly not being shown, with the telescoping tubes of the walker apparatus being shown in an extended position and with the brake cable of FIG. 15 shown in ghost.

As seen in FIG. 16, each of the inner tubes 44 has a plurality of longitudinally spaced-apart apertures 46 which define a length L of adjustment range. The walker apparatus 20 includes a pair of coupling mechanisms for selectively coupling the pairs of telescoping tubes 42 and 44 together, in this example in the form of thumb screws 48. The thumb screws are rotatably coupled to the outer tubes 42 in this example. Selective rotation of the thumb screws causes the thumb screws to be selectively inserted through one of said apertures 46 of the inner tube 44 to fixedly adjust the height of the telescoping tubes. This enables the height of the walker apparatus to be adjusted to provide an optimized handlebar height for the user. The height of the walker apparatus is thus adjustable from a retracted position of the tubes 42 and 44 seen in FIG. 15 to an extended position of the tubes seen in FIG. 16 as well as positions therebetween.

Figure 6:
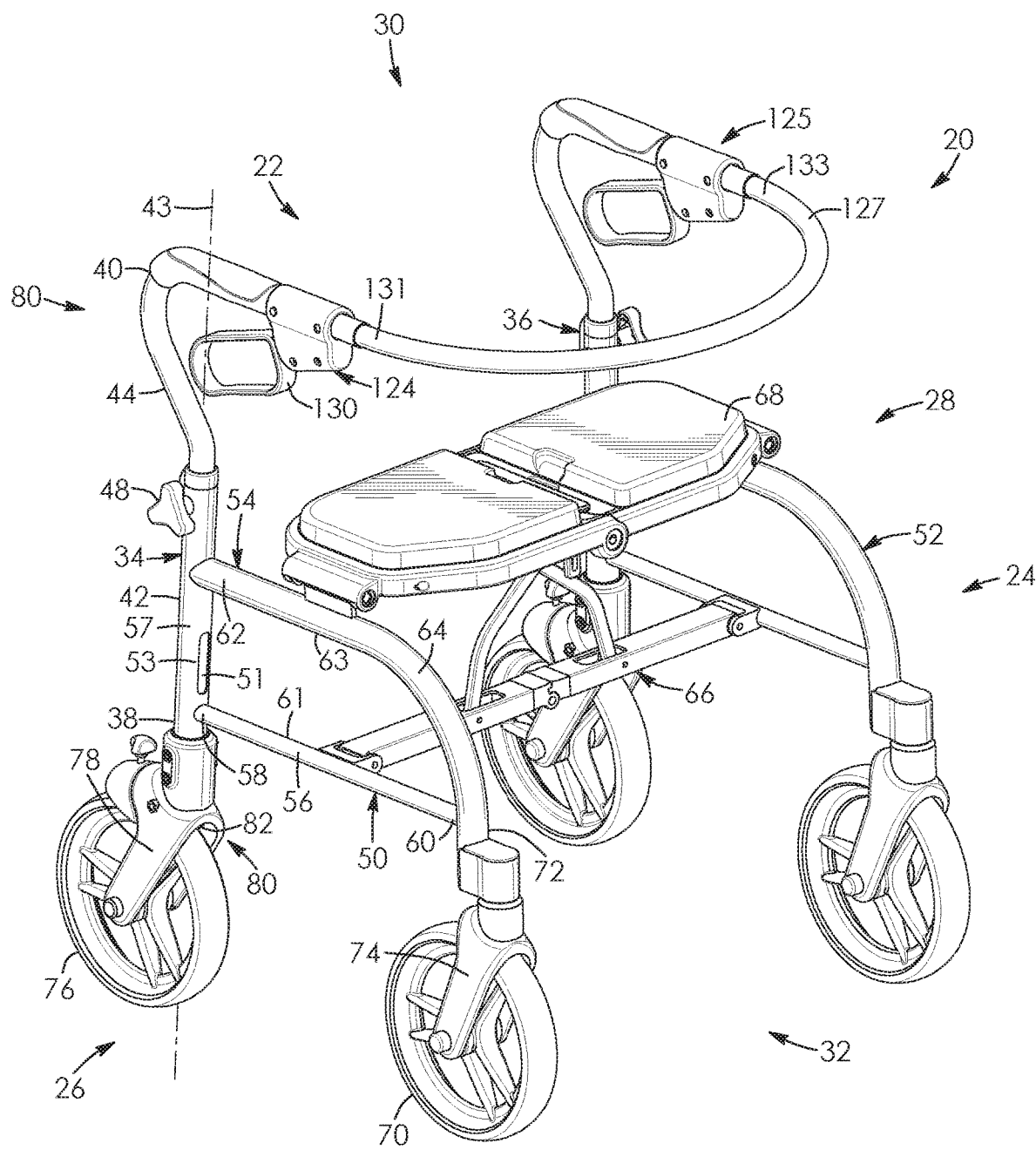
FIG. 6 is a top, front, left side perspective view of the walker apparatus of FIG. 1, with the brake cable housings thereof being removed.
Figure 7:
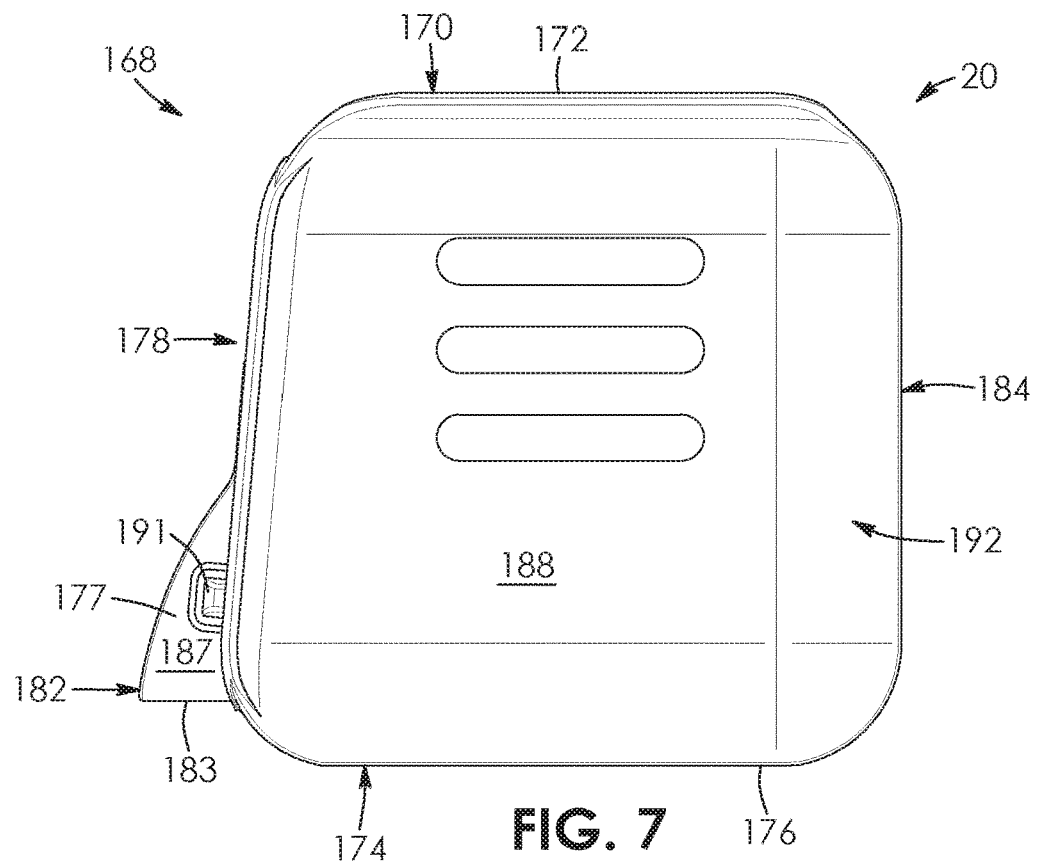
FIG. 7 is an outer side elevation view of one of the brake cable housings of FIG. 1.

As seen in FIG. 6, each of the outer tubes 42 of the upright assemblies 34 has an aperture 51 extending therein and which is slot shaped and obround in this example. The apertures face the front 24 of the walker apparatus 20 in this example. Each aperture 51 is interposed between the lower end 38 and upper end 40 of its upright assembly 34. Each aperture is adjacent to and spaced-apart upwards from the corresponding end 38 of its upright assembly.

Referring back to FIG. 1, the walker apparatus 20 includes a pair of spaced-apart laterally-extending assemblies 50 and 52. The laterally-extending assemblies align with respective ones of the sides 26 and 28 of the walker apparatus and extend from near the bottom 32 towards the top 30 thereof. Each of the laterally-extending assemblies includes a pair of spaced-apart, elongate upper and lower side members, or side frame members, with the upper members being in the form of tubes 54 in this example and the lower members being the form of rods 56 in this example. Each rod has a proximal end 58 coupled to corresponding outer tube 42 and a distal end 60 spaced-apart from its proximal end. Rods 56 thus couple to and extend radially outwards from tubes 42 and upright assemblies 34 and 36. Each rod 56 extends laterally-outwards and perpendicular from its corresponding outer tube 42 towards the front 24 of the walker apparatus 20, in this example. Each rod has a longitudinally-extending top 61 which faces corresponding tube 54 of its laterally-extending assembly 50. As seen in FIG. 15, the tops of the rods are curved at least in part in lateral cross-section and outwardly convex in lateral cross-section in this example.

Each tube 54 includes a substantially-straight portion 62 in this example which is coupled to and extends laterally-outwards from corresponding outer tube 42 towards the front 24 of the walker apparatus 20. As seen in FIG. 6, aperture 51 of tube 42 is interposed and extends between rod 56 and substantially-straight portion 62 of tube 54 and is positioned adjacent to rod 56 in this example. Referring to FIG. 1, each straight portion 62 of the tubes 54 has a longitudinally-extending bottom 63 which face the top 61 of its corresponding rod 56. The bottoms of the straight portions of the tubes 54 are curved at least in part in lateral cross-section and outwardly convex in lateral cross-section in this example. As seen in FIG. 1, each tube 54 includes a curved portion 64 in this example which couples to and is interposed between the straight portion 62 thereof and distal end 60 of its corresponding rod 56.

Still referring to FIG. 1, the walker apparatus includes folding mechanism 66 in this example coupled to and extending between the laterally-extending assemblies 50 and 52. The folding mechanism is configured to enable the walker apparatus 20 to selectively fold laterally. The walker apparatus includes a seat assembly 68 which extends between and couples to the straight portions 62 of tubes 54 of the laterally-extending assemblies 50 and 52 in this example. The various parts and functionings of the folding mechanism 66 and seat assembly 68 are described in more detail in U.S. Pat. No. 8,083,239, the disclosure of which is incorporated herein by reference.

As seen in FIG. 1, the walker apparatus 20 includes a first or front pair of ground-engageable wheels 70 operatively coupled to and pivotable relative to the distal ends 72 of the curved portions 64 of tubes 54 by way of wheel forks 74. The walker apparatus includes a second or rear pair of ground-engageable wheels operatively coupled to and rotatable relative to the lower ends of the upright assemblies. This is shown by wheel 76 operatively coupled to end 38 of assembly 34 via wheel fork 78.

The walker apparatus 20 includes a pair of brake assemblies for respective ones of its second pair of ground-engageable wheels, as shown by brake assembly 80 for wheel 76 in FIG. 1.

Figure 4:
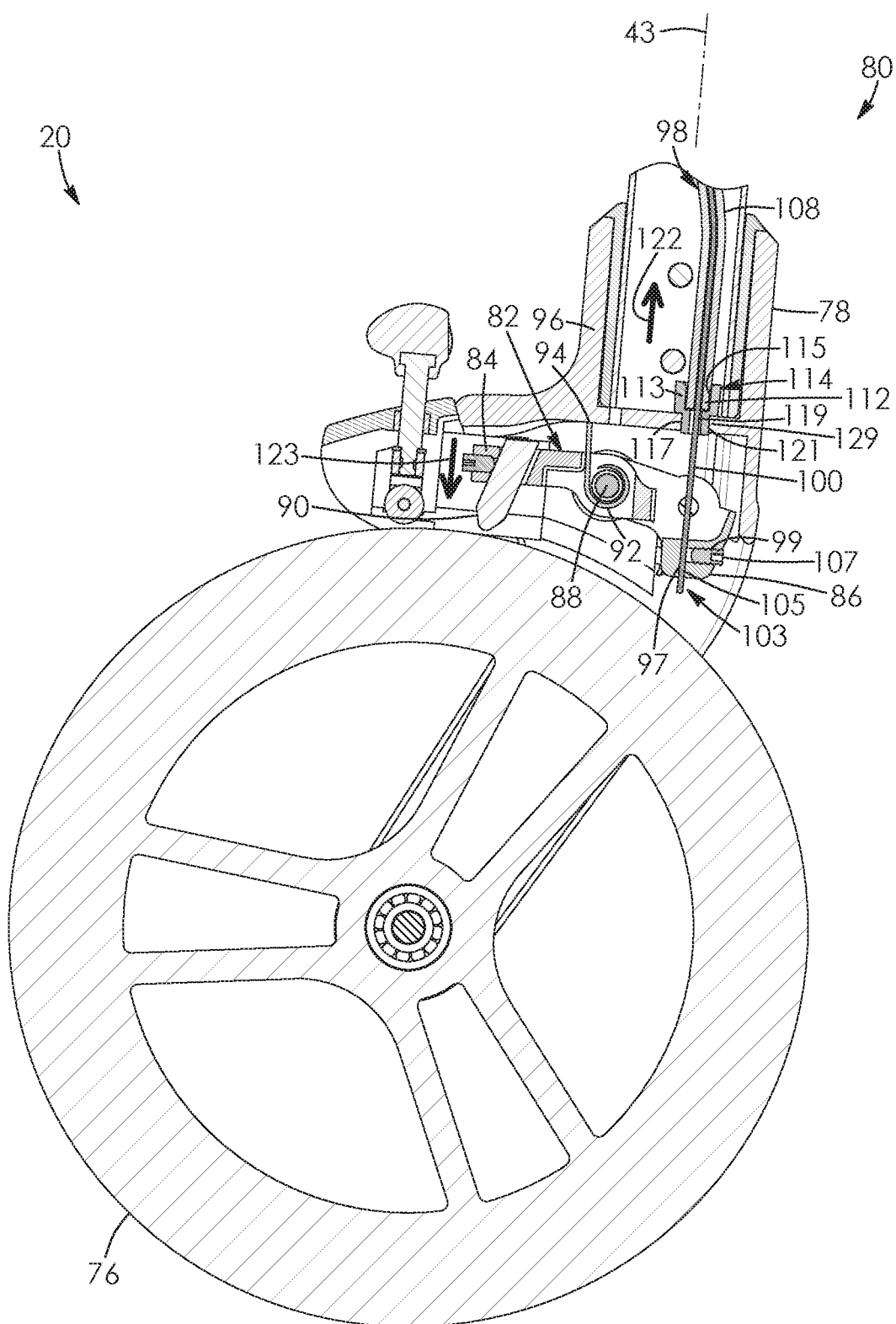
FIG. 4 is a side elevation cross-sectional view of one of the ground-engageable wheels of the walker apparatus of FIG. 1, together with a wheel fork thereof and a wheel-engaging brake member for the brake assembly of FIG. 1.

As seen in FIG. 4, each brake assembly includes a wheel-engaging brake member 82. Each wheel-engaging brake member has a first end 84 and a second end 86 spaced-apart from the first end. In this example each wheel-engaging brake member 82 pivotally connects to its respective wheel fork 78 at a pivot point 88 which is interposed between the first and second ends of the wheel-engaging brake member. Each wheel-engaging brake member 82 includes a brake pad 90 in this example coupled to and extending downwards from the first end 84 thereof. Each brake pad faces its corresponding wheel 76. Each wheel-engaging brake member 82 includes in this example a resilient member in the form of a coiled spring 92 which extends about the pivot point 88 of the wheel-engaging brake member. The coiled spring has an elongate end 94 which abuts a side wall 96 of the wheel fork 78 in this example. The coiled spring 92 is configured to spring-bias the brake pad 90 upwards from wheel 76.

Each wheel-engaging brake member 82 includes a first bore 97 extending therethrough adjacent to the second end 86 thereof in this example. Each wheel-engaging brake member includes a second bore 99 which is threaded in this example and which is adjacent to the second end thereof. The second bore in communication with and which extends perpendicular to bore 97 in this example. Each brake assembly 80 includes a securing mechanism, in this example in the form of a set screw 107 that extends through bore 99 and threadably engages therewith.

Figure 5:
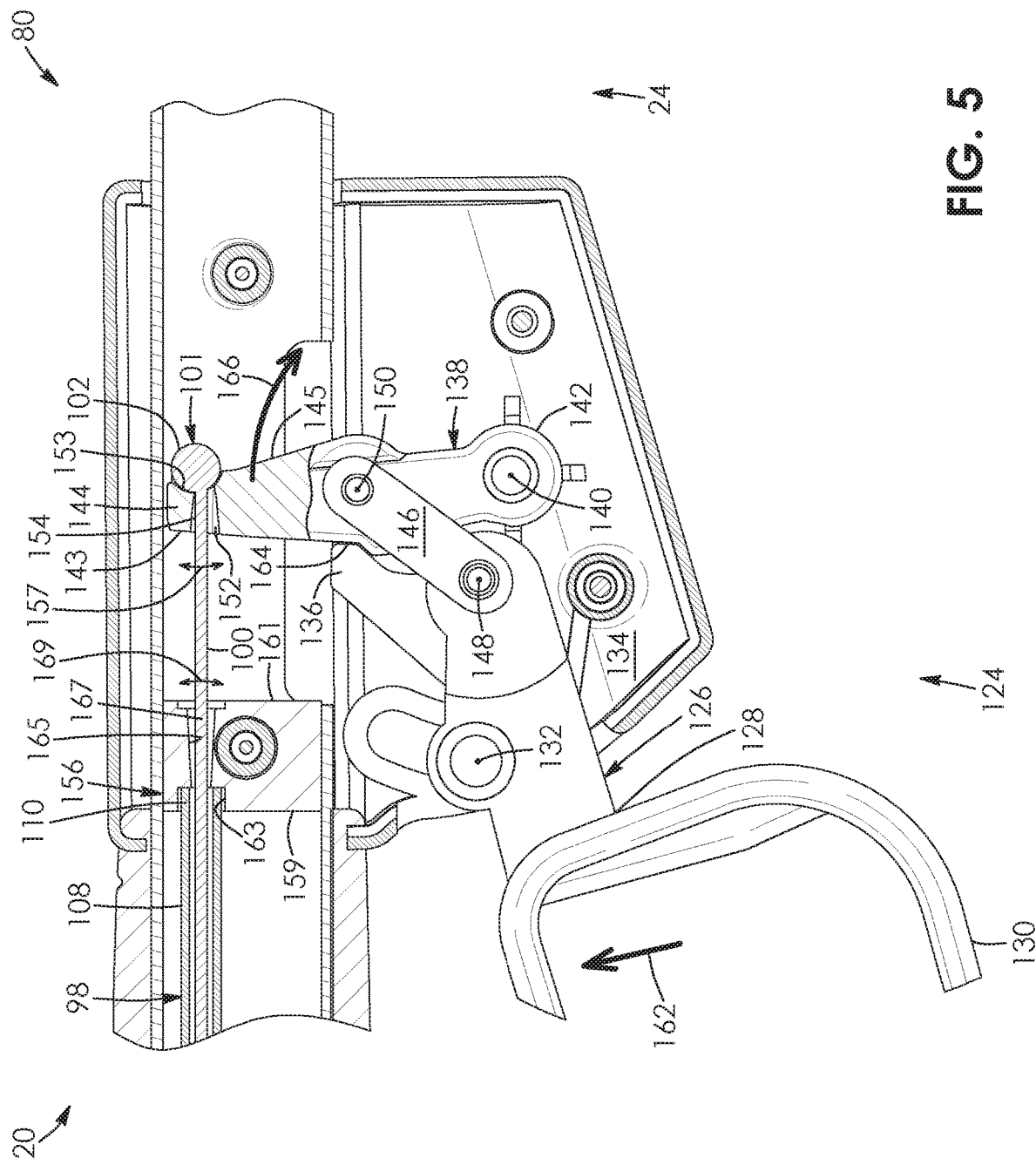
FIG. 5 is a side elevation, partially fragmented, cross-sectional view of the interior of a handle bar assembly of the walker apparatus of FIG. 1.

Each brake assembly 80 further includes a brake cable, in this example in the form of a bowden cable 98. The bowden cable includes a flexible, inner cable 100. As seen in FIG. 5, the inner cable has an upper or first end 101 with a protrusion, in this example nipple 102 thereat. The nipple is cylindrical in shape in this example. As seen in FIG. 4, each inner cable 100 has a lower or second end 103. The second end of the inner cable 100 is operatively coupled to the second end 86 of wheel-engaging brake member 82 by portion 105 of the cable which extends through bore 97 and thereafter by set screw 107 engaging with said portion 105. The set screw enables the tension of inner cable 100 to be adjusted by lowering or elevating end 103 of the inner cable and thereafter securing the cable in place via the set screw.

As seen in FIG. 15, each bowden cable 98 has an elongate portion 111 which extends along and is primarily enclosed within its corresponding upright assembly 34. The elongate portion of the cable is generally parallel with longitudinal axis 43 where the elongate portion enters within outer tube 42 and the telescoping portion 45 of the inner tube 44. Each cable 98 has a slack portion 109 extending through the aperture 51 of the assembly 34. The slack portion of the brake cable assembly is a coiled section of the brake cable assembly that is loop-shaped in this example. As seen in FIG. 15, the slack portion 109 of the cable 98 extends laterally outwards from assembly 34 relative to longitudinal axis 43.

Referring to FIG. 5, each bowden cable 98 includes a flexible outer casing 108 through which the inner cable 100 extends and is moveable relative thereto. The casing has a first end 110 seen in FIG. 5 and a second end 112 seen in FIG. 4. Second end 112 of casing 108 is operatively coupled to wheel fork 78 via a mount 114 through which inner cable 100 extends. Each mount is tubular in this example with a first or upper sleeve 113 with a bore 115 extending therethrough. Each upper sleeve is shaped to extend about and receive corresponding end 112 of its casing 108. Each mount 114 includes a second or lower sleeve 117 coupled to and extending downwards from the upper sleeve 113 thereof. Each lower sleeve includes a bore 119 extending therethrough. Bore 119 is shaped to slidably receive inner cable 100 therethrough, is in communication with bore 115 and has a diameter that is smaller than that of bore 115 in this example. Lower sleeve 117 is shaped to fit within an inner aperture 121 of the wheel fork 78, with upper sleeve 113 being configured to abut portions 129 of the wheel fork adjacent to said aperture 121.

Upward movement of inner cable 100 causes end 86 of wheel-engaging brake member 82 to more upwards relative to FIG. 4, as shown by arrow of numeral 122. The upward movement of the cable in turn causes end 84 and brake pad 90 of the wheel-engaging brake member to move downwards, as shown by arrow of numeral 123, for engaging the pad against the wheel 76 and braking the wheel. Thus, each wheel-engaging brake member 82 operatively connects to the lower end 38 of its upright assembly 34 seen in FIG. 1. The wheel-engaging brake member 82 as herein described is one example only for walker apparatus 20 and the brake assembly 80 may use other braking systems for the bowden cable 98 in other embodiments.

As seen in FIG. 1, the walker apparatus 20 includes a pair of handle bar assemblies 124 and 125 coupled to the upper ends 40 of respective ones of the upright assemblies 34 and 36. The walker apparatus includes an arcuate-shaped backrest 127 in this example positioned along the front 24 thereof. The backrest is in the shape of a flexible strap in this example and extends between the handle bar assemblies 124 and 125. As seen in FIG. 1, the backrest 127 couples to the handle bar assemblies via spaced-apart ends 131 and 133 of the backrest.

Each of the handle bar assemblies, as seen by assembly 124 in FIG. 5, includes a first handle lever 126. Each first handle lever has a first end 128 and a second end 136 spaced-apart from its first end. Each brake assembly 80 includes a brake actuator, in this example in the form of a gripping handle 130 coupled to and extending from end 128 of its lever 126. Each handle bar assembly 124 has a handle bar housing 134. Each first handle lever 126 is pivotally mounted via pivot 132 to said housing 134.

Each of the handle bar assemblies 124 includes a second handle lever 138. Each second handle lever has a first end 142, a second end 144 spaced-apart from its first end, a first side 143 facing casing 108 and a second side 145 opposite the first side. Ends 142 and 144 of the lever 138 extend between sides 143 and 145 of the lever. Each second handle lever 138 is pivotally mounted to its corresponding handle bar housing 134 via pivot 140 located adjacent to the first end 142 thereof. Second end 136 of first handle lever 126 is positioned to be engageable with second handle lever 138 at a location 164 between ends 142 and 144 of lever 138.

Each handle bar assembly 124 includes a link 146 which pivotally connects first handle lever 126 to second handle lever 138 via pivot 148 which is between ends 128 and 136 of the first handle lever, and pivot 150 which is between ends 142 and 144 of the second handle lever. Lever 138 has a tapered bore 152 extending therethrough in this example adjacent to end 144 thereof. The bore extends from side 143 towards side 145 of the lever and is wider in cross-section at side 143 compared to its cross-section adjacent to side 145. Put another way, bore 152 enlarges from side 145 to side 143 of the lever 138. Each lever 138 further includes in this example a seat 153 that is partially spherical in this example and which is in communication with bore 152. Each seat 153 is adjacent and recessed relative to side 145.

First end 101 of inner cable 100 operatively couples to second end 144 of lever 138, and thus operatively connects to gripping handle 130, by portion 154 of the inner cable adjacent to nipple 102 extending through bore 152. Nipple 102 is larger than bore 152 and is shaped to be received by seat 153. As seen in FIG. 1, the gripping handles 130 thus operatively connect to the upper ends 40 of their upright assemblies 34. The outwardly tapered nature of bore 152 enables portion 154 of the inner cable 100 to selectively tilt upwards and downwards as indicated by arrow of numeral 157.

End 110 of casing 108 couples to handle bar housing 134 via a mount 156 through which inner cable 100 extends. The mount is generally cylindrical in shape in this example and has a first side 159 facing casing 108 and a second side 161 opposite the first side. Each mount 156 includes in this example a seat 163 that is cylindrical in shape and recessed relative to side 159 thereof. End 110 of casing 108 is shaped to be received within seat 163. Each mount also includes in this example a tapered bore 165 which extends from side 161 towards side 159 thereof. The bore is wider in cross-section at side 161 relative to where the bore is adjacent to side 159. Put another way, bore 165 enlarges from side 159 to side 161 of the mount 156. Bore 165 is in communication with seat 163. Portions 167 of inner cable 100 extend through bore 165 as the cable extends to nipple 102. The outwardly tapered nature of bore 165 enables portions 167 of the inner cable 100 to selectively tilt upwards and downwards as indicated by arrow of numeral 169.

In operation and referring to FIG. 5, upward movement of the gripping handles 130, as shown by arrow of numeral 162, causes end 136 of lever 126 to engage lever 138 at location 164 interposed between ends 142 and 144 of lever 138. This causes lever 138 to selectively rotate towards the front 24 of the walker apparatus 20 in a clockwise direction relative to FIG. 5 as shown by arrow of numeral 166. End 144 of lever 138 and thus end 101 of inner cable 100 are pulled to the right relative to FIG. 5 thereby. This causes the inner cable 100 to be actuated and move relative to casing 108 for selectively actuating wheel-engaging brake member 82 seen in FIG. 4.

Referring to FIG. 4, each bowden cable 98 thus has a first end coupled to a first portion of an elongate assembly, in this example in the form of the wheel-engaging brake member 82 seen in FIG. 4 of upright assembly 34 seen in FIG. 15. Referring to FIG. 5, each cable also has a second end coupled to a second portion of the elongate assembly with the second portion's positioning relative to the first portion being adjustable, in this example in the form of handle bar assembly 124 for upright assembly 34.

The gripping handle 130 seen in FIG. 5 and related linking assembly as herein described are one example only for walker apparatus 20 and the brake assembly 80 may use other brake actuators for the bowden cable 98 in other embodiments.

The walker apparatus 20 described to this stage is directed to one example of a walker apparatus and walker apparatuses of other shapes and configurations are possible, as would be clear to one skilled in the art. For example, the laterally-extending assemblies, handles, backrest, folding mechanism, wheel assemblies and seat assembly of the walker apparatuses set out in U.S. Pat. Nos. 8,083,239 and 9,339,432 could be used in other embodiments, the disclosures of which are incorporated herein by reference.

Figure 14:
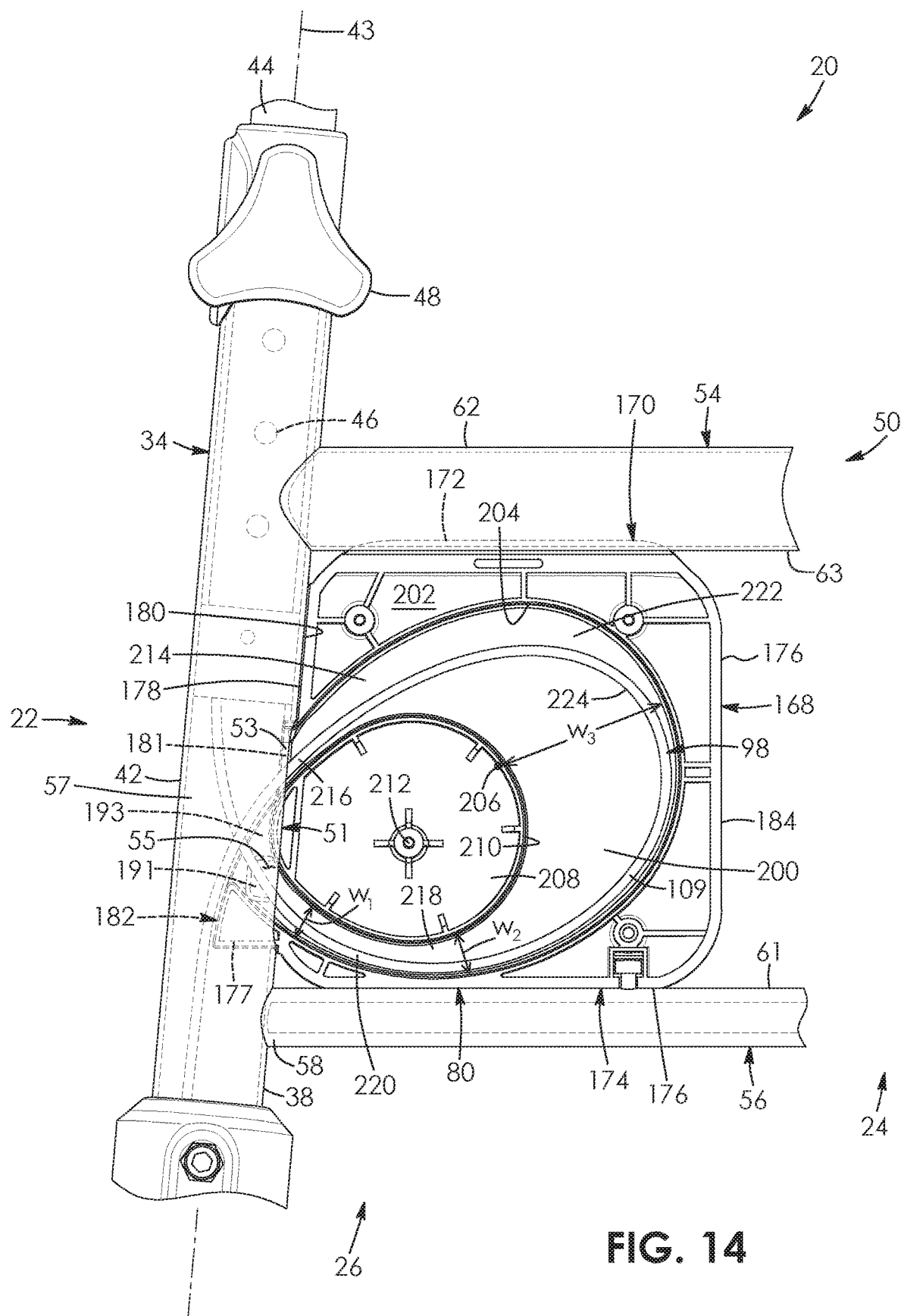
FIG. 14 is an enlarged view of the brake cable housing of FIG. 7, with one of the half sections of the housing being removed to reveal the interior of the housing, and a fragmented view of a telescoping assembly and laterally-extending elongate side members of one side of the walker apparatus of FIG. 1, the telescoping assembly and part of the brake cable housing being shown partially in ghost.

Referring to FIG. 1, the walker apparatus 20 includes a pair of hollow, brake cable housings corresponding to respective ones of the upright assemblies, as seen by brake cable housing 168 for upright assembly 34. As seen in FIG. 14, each housing is shaped to enclose the slack portions 109 of its corresponding bowden cable 98. Each brake cable housing 168 is generally in the shape of a hollow, rectangular prism in this example.

Figure 9:
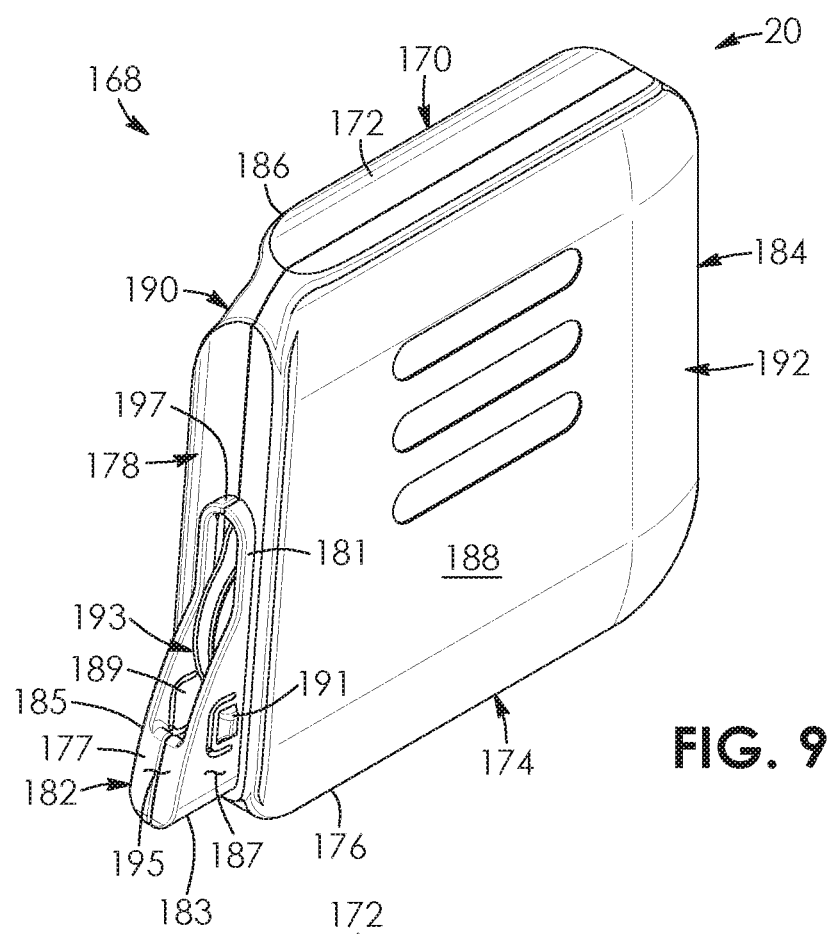
FIG. 9 is a top, rear, outer side perspective view thereof.
Figure 11:
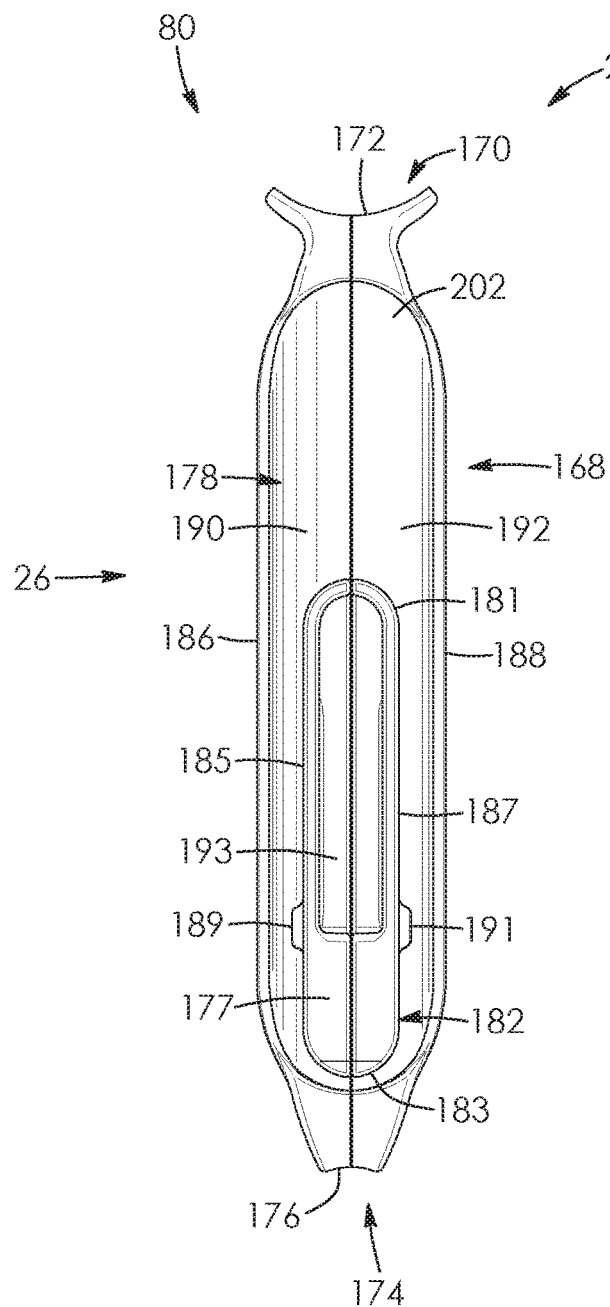
FIG. 11 is a rear elevation view thereof.

As seen in FIG. 9, each brake cable housing has an elongate top 170 and an upper peripheral edge portion 172 extending along the top. As seen in FIG. 11, the upper peripheral edge portion is u-shaped and outwardly concave in an upwards direction in this example. Referring to FIG. 14, the upper peripheral edge portion 172 of the housing 168 is shaped to align with and receive the bottom 63 of the substantially-straight portion 62 of tube 54 in this example. However, this is not strictly required and the housing may couple to the walker apparatus in another manner and at another location on its framing or laterally-extending assembly 50 according to other embodiments.

Figure 10:
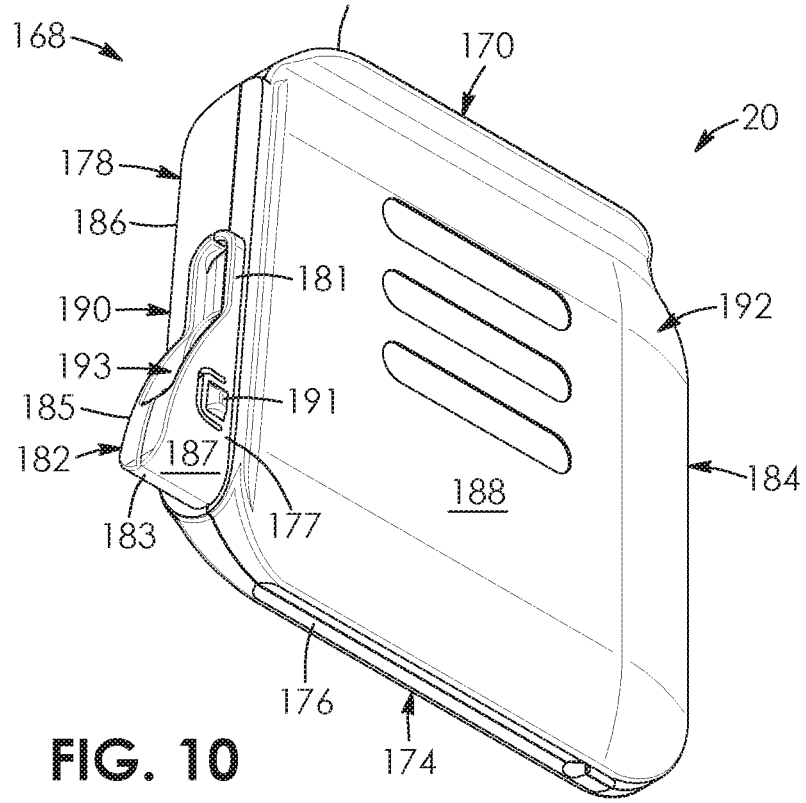
FIG. 10 is a bottom, rear, outer side perspective view thereof.

As seen in FIG. 10, each housing 168 has an elongate bottom 174 opposite its top 170 and a lower peripheral edge portion 176 extending along said bottom. As seen in FIG. 11, the lower peripheral edge portion 176 is u-shaped and outwardly concave in a downwards direction in this example. Referring to FIG. 14, the lower peripheral edge portion of the housing 168 is shaped to align with, extend along in part and receive the top 61 of rod 56 in this example. Each housing 168 is thus interposed and extends between one rod 56 and a corresponding substantially-straight portion 62 of tube 54. Here too this is not strictly required and the housing may couple to the walker apparatus in another manner and at another location on its framing or laterally-extending assembly 50 in other embodiments. As seen in FIG. 1, frame members, in this example tube 54, rod 56 and a portion 57 of the outer tube 42, extend about, protect and enclose brake cable housing 168.

Referring to FIG. 9, each housing 168 further includes an elongate rear 178 which extends between the top 170 and bottom 174 thereof and which is generally u-shaped in cross-section in this example. As seen in FIG. 14, the rear of the housing extends along and is shaped to abut and receive a portion 180 of tube 42 of its corresponding upright assembly 34 extending between the tube 54 and rod 56 in this example. However, this manner and location of connection is not strictly required and instead of directly connecting, the housing may merely operatively connect to the upright assembly 34 in other embodiments. Brake cable housing 168 thus couples to and is axially offset from the tubes 42 and 44 of assembly 34.

As seen in FIG. 9, each brake cable housing 168 includes a hollow protrusion 182 which extends outwards from rear 178 thereof. Each protrusion includes a peripheral rim portion 181 which couples to and extends outwards from the rear of the housing. The rim portion is obround in this example as best seen in FIG. 11. Rim portion 181 is shaped to fit within oblong aperture 51 of tube 42 as seen in FIG. 6. As seen in FIG. 14, portions 53 of tube 42 extending around the aperture are configured to snugly abut with the rim portion 181 in this example.

As seen in FIG. 9, the protrusion includes a lower section 177 that is generally in the shape of a right triangular prism in this example and which couples to and extends outwards from rim portion 181. Each protrusion 182 includes an elongate bottom 183 which aligns with and is adjacent to bottom 174 of housing 168. The lower section 177 of the protrusion includes a pair of spaced-apart planar sides 185 and 187 which are generally triangular in shape in this example. The sides of the protrusion 182 extend from the bottom 183 of the protrusion towards the top 170 of the housing 168. As seen in FIG. 11, sides 185 and 187 are inwardly spaced-apart from and extend in parallel with sides 186 and 188 of housing 168 in this example.

Referring to FIGS. 9 and 11, each protrusion includes a pair of resilient members, in this example in the form of resilient tabs 189 and 191 outwardly extending from respective ones of sides 185 and 187. As seen in FIG. 14, the tabs are shaped to outwardly abut portions adjacent portions 55 of tube 42 when the lower section 177 of the protrusion 182 is positioned within aperture 51 of the tube 42.

As seen in FIG. 9, the lower section 177 of protrusion 182 includes a rear 195 which is slanted in this example and which extends from bottom 183 towards the top 197 of rim portion 181. Rear 195 is elongate and extends between sides 185 and 187 of the lower section 177 of the protrusion. Each protrusion includes a recessed aperture 193 extending through rear 195 of lower section 177 thereof. The aperture is interposed between the sides 185 and 187 and bottom 183 of the protrusion.

As seen in FIG. 14 and mentioned above, the lower section 177 of protrusion 182 extends through aperture 51 of the corresponding tube 42 for mounting the brake cable housing 168 to the upright assembly 34. As seen in FIG. 1, each brake cable housing 168 thus operatively connects to its corresponding upright assembly 34 at a location between its gripping handle 130 and wheel-engaging brake member 82.

Figure 12:
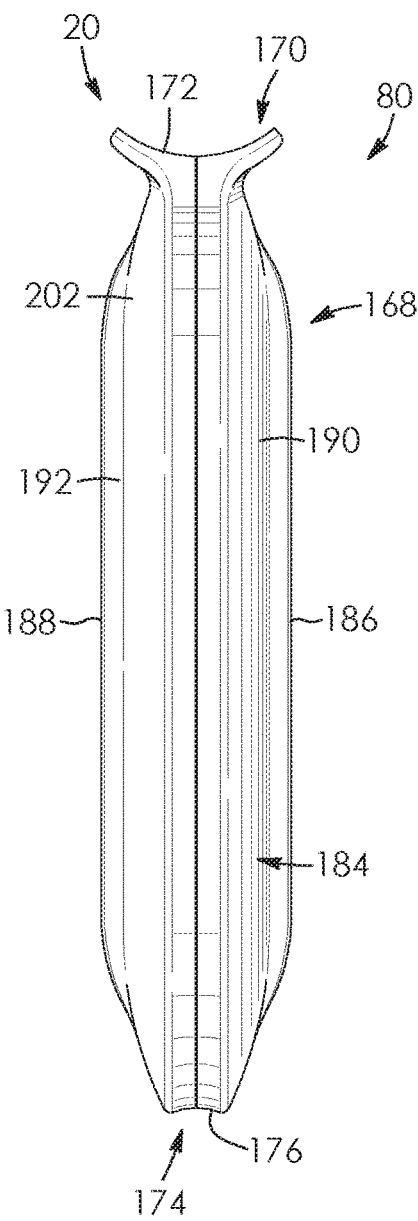
FIG. 12 is a front elevation view thereof.

As best seen in FIG. 12, each housing 168 has a front 184 spaced-apart from the rear 178 thereof as best seen in FIG. 11. Referring back to FIG. 12, the front of the housing extends between the top 170 and bottom 174 thereof. As seen in FIG. 15, the front 184 of the housing 168 is substantially vertically-extending and straight in this example.

Figure 8:
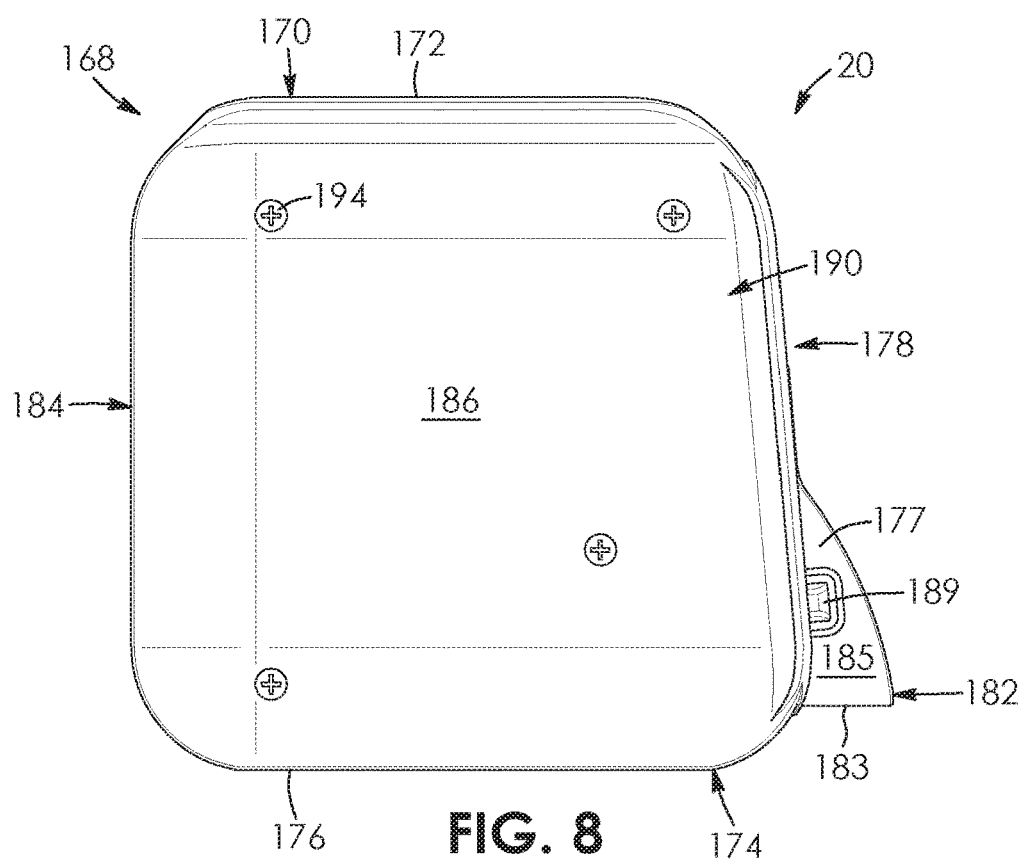
FIG. 8 is an inner side elevation view thereof.

The brake cable housings have inner sides which face each other, as seen in FIG. 8 by inner side 186 for housing 168. Each housing includes an outer side 188 facing opposite from its inner side. The inner and outer sides of the housing 168 are substantially planar and rectangular in this example and extend between the top 170, bottom 174, rear 178 and front 184 of the housing.

As seen in FIG. 11, each brake cable housing 168 includes a first part 190 which extends between top 170, bottom 174, rear and front thereof and which extends from its inner side 186 towards outer side 188. As seen in FIG. 1, the first part of the housing extends between and abuts rod 56 and portion 62 of tube 54 at a first or inner side 196 thereof seen in FIG. 2.

As seen in FIG. 9, each brake cable housing 168 includes a second part 192 that is complementary to, selectively connectable to and selectively removable from part 190. Parts 190 and 192 are respective halves of the housing in this example though this is not strictly required. Part 192 extends between the top 170, bottom 174, rear 178 and front 184 of the housing 168, and extends from the outer side 188 of the housing towards the inner side 186 of the housing. Part 192 is shaped to selectively couple with part 190 via a plurality of fasteners 194 in this example as seen in FIG. 8. As seen in FIG. 1, part 192 extends between and abuts rod 56 and portion 62 of tube 54 at a second or outer side thereof 198. The brake cable housing 168 selectively couples to its corresponding laterally-extending assembly 50 of the walker apparatus 20 thereby.

As seen in FIG. 14, each brake cable housing 168 has an interior space 200 that is generally crescent-shaped in this example. Each brake cable housing has an outer portion 202 which extends along the top 170, bottom 174, rear 178, and front 184 thereof and, as seen in FIG. 11, between sides 186 and 188 thereof. As seen in FIG. 14, the outer portion 202 of the housing has an inner wall or peripheral edge 204 which encloses the interior space 200 thereof along with the sides of the housing. The inner peripheral edge of the outer portion is inwardly concave and is generally tear-drop shaped in this example. The outer portion 202 of the housing has a central axis 206 in this example.

Each housing 168 includes an inner portion 208 positioned within the interior space 200 thereof. The inner portion of the housing has an outer peripheral edge 210 which is outwardly convex in this example. The inner portion 208 of the housing 168 has a central axis 212 which is axially offset from the central axis 206 of the outer portion 202 of the housing.

As seen in FIG. 14, the brake cable housing 168 receives and in this example encloses a slack portion 109 of bowden cable 98 within interior space 200 thereof. The brake cable housing includes an upper passageway 214 within the interior space thereof. The upper passageway extends from the rear 178 of the housing adjacent to aperture 51 towards the top 170 and front 184 of the housing. The upper passageway 214 is downwardly concave in shape in this example. The upper passageway is shaped to receive excess portions 216 of the bowden cable 98 extending from the wheel-engaging brake member 82 and thus lower end 103 of inner cable 100 seen in FIG. 4.

Referring back to FIG. 14, the brake cable housing 168 includes a lower passageway 218 within the interior space 200 thereof. Aperture 193 of lower section 177 of protrusion 182 is part of the lower passageway in this example. The lower passageway 218 thus extends through protrusion 182 of the housing 168 in this example towards the bottom 174 and front 184 of the housing. The lower passageway 218 is upwardly concave in shape in this example. The lower passageway 218 is shaped to receive excess portions 220 of bowden cable 98 extending from the gripping handle 130 as seen in FIG. 5 and thus extending from end 101 of inner cable 100.

Figure 13:
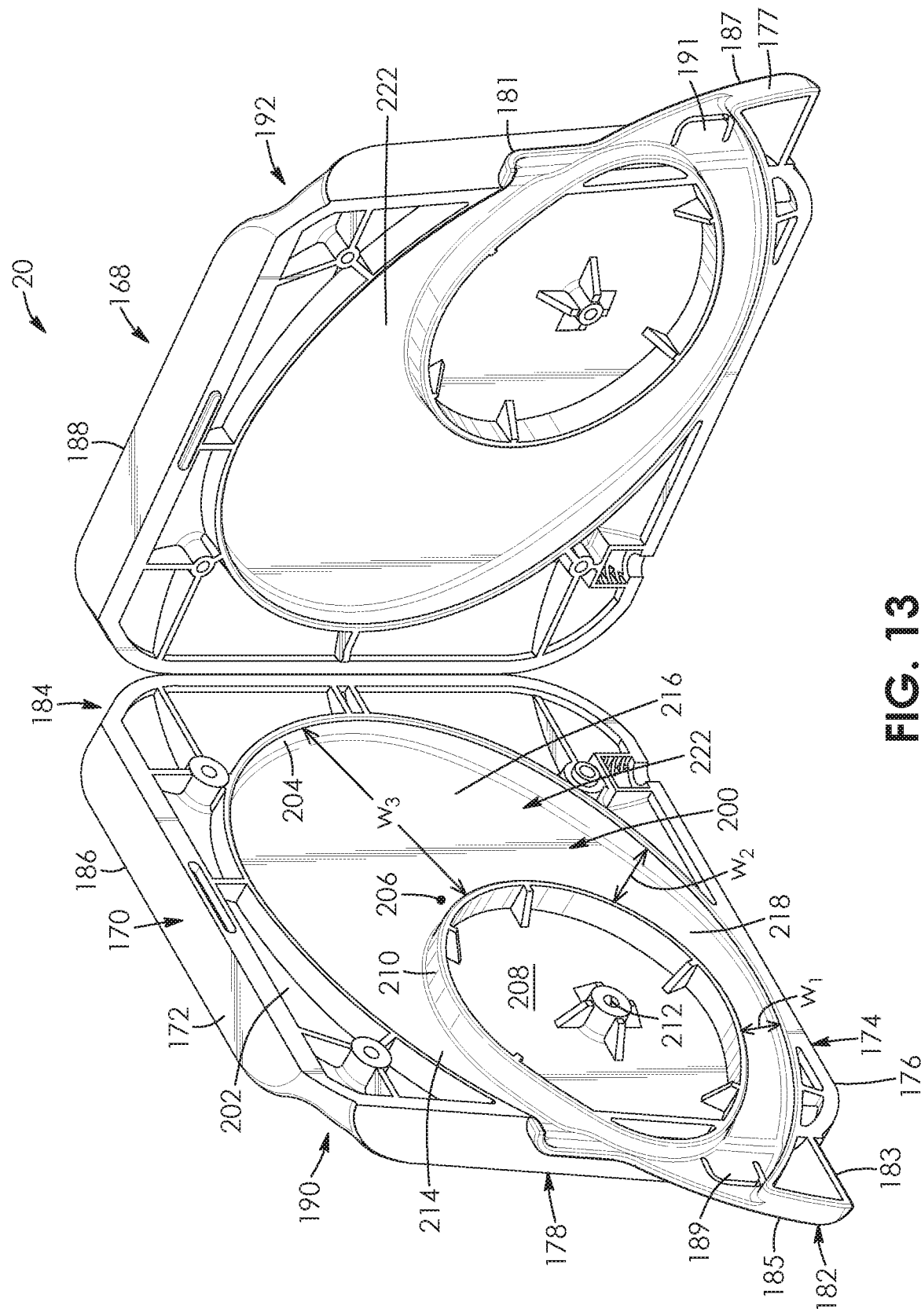
FIG. 13 is a rear, top perspective view thereof, the brake cable housing comprising two half sections, the half sections being angled apart relative to each to reveal features of the interior of the brake cable housing.

As seen in FIG. 14, each brake cable housing 168 includes a chamber 222 within the interior space 200 thereof. The chamber is interposed between and in communication with the passageways 214 and 218. The cross-sectional widths of the upper passageway and the lower passageway taper so as to increase as the passageways extend from the upright assembly 34 towards the chamber 222. This is shown by width $W_1$ of passageway 218 adjacent to tube 42 being smaller than width $W_2$ of the passageway 218 adjacent chamber 222. The chamber is shaped to receive further excess portions 224 of bowden cable 98 coupled to and integrally formed with excess portions 216 and 220 thereof. The chamber 222 is concave in this example in a direction facing the upper passageway 214 and the lower passageway 218. The chamber is larger in volume and cross-section width $W_3$ compared to the upper passageway 214 and compared to the lower passageway 218. As seen in FIG. 13, the chamber 222 is c-shaped in this example.

In operation and referring to FIG. 15, slack portion 109 of bowden cable 98 abuts the inner peripheral edge 204 of the outer portion 202 of its corresponding housing 168 when the walker apparatus 20 is its retracted position. As seen in FIG. 14, the slack portion of the bowden cable 98 extends at least in part between the outer peripheral edge 210 of the inner portion 208 of housing 168 and inner peripheral edge 204 of outer portion 202 of the housing when the walker apparatus 20 is in an intermediate position between the retracted position seen in FIG. 15 and the extended position seen in FIG. 16.

As seen in FIG. 16, slack portion 109 of bowden cable 98 abuts the outer peripheral edge 210 of the inner portion 208 of its corresponding housing 168 when the walker apparatus 20 is its extended position. The slack portion 109 of bowden cable 98 forms an enlarged loop in the retracted position of the apparatus 20 seen in FIG. 15. As seen in FIG. 16, the slack portion of Bowden cable forms a reduced loop shape spanning a planar area that is less than that of the enlarged loop shape when the apparatus is in an extended position seen in FIG. 15.

Figure 17:
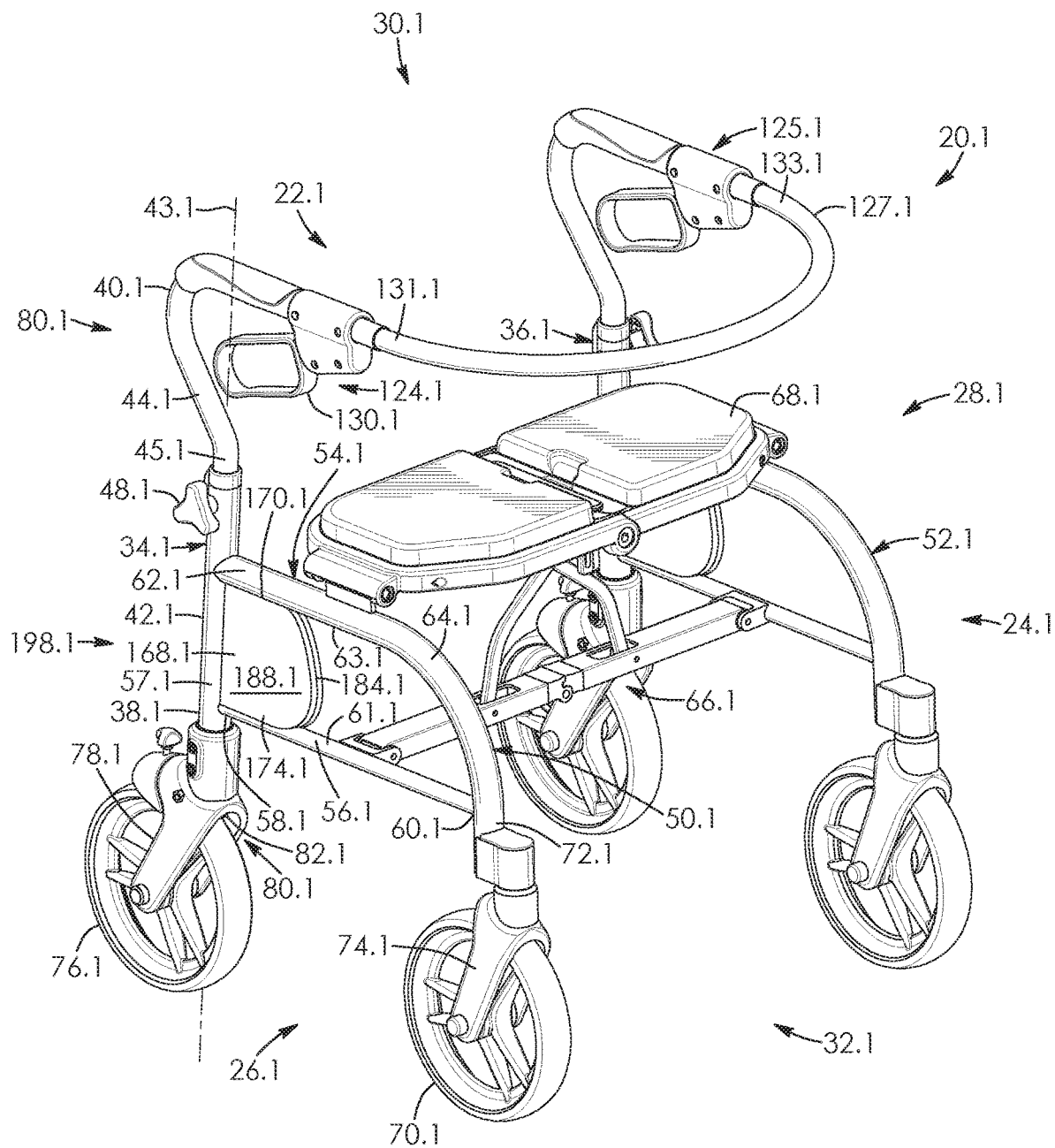
FIG. 17 is a top, front, left side perspective view of a patient transport apparatus according to a second aspect, the patient transport apparatus comprising a walker apparatus that includes a folding mechanism, a seat assembly, and a brake assembly, the brake assembly including a pair of spaced-apart brake cable housings.

FIG. 17 shows a height-adjustable walker apparatus 20.1 according to a second aspect. Like parts have like numbers and functions as the height-adjustable walker apparatus 20 shown in FIGS. 1 to 16 with the addition of decimal extension ".1". Walker apparatus 20.1 is substantially the same as walker apparatus 20 shown in FIGS. 1 to 16 with the following exceptions. Front 184.1 of the housing 168.1 is outwardly convex in a direction facing the front 24.1 of the walker apparatus 20.1 in this example instead of being substantially vertically-extending and straight in this example like front 184 of housing 168 seen in FIG. 1.

Figure 18:
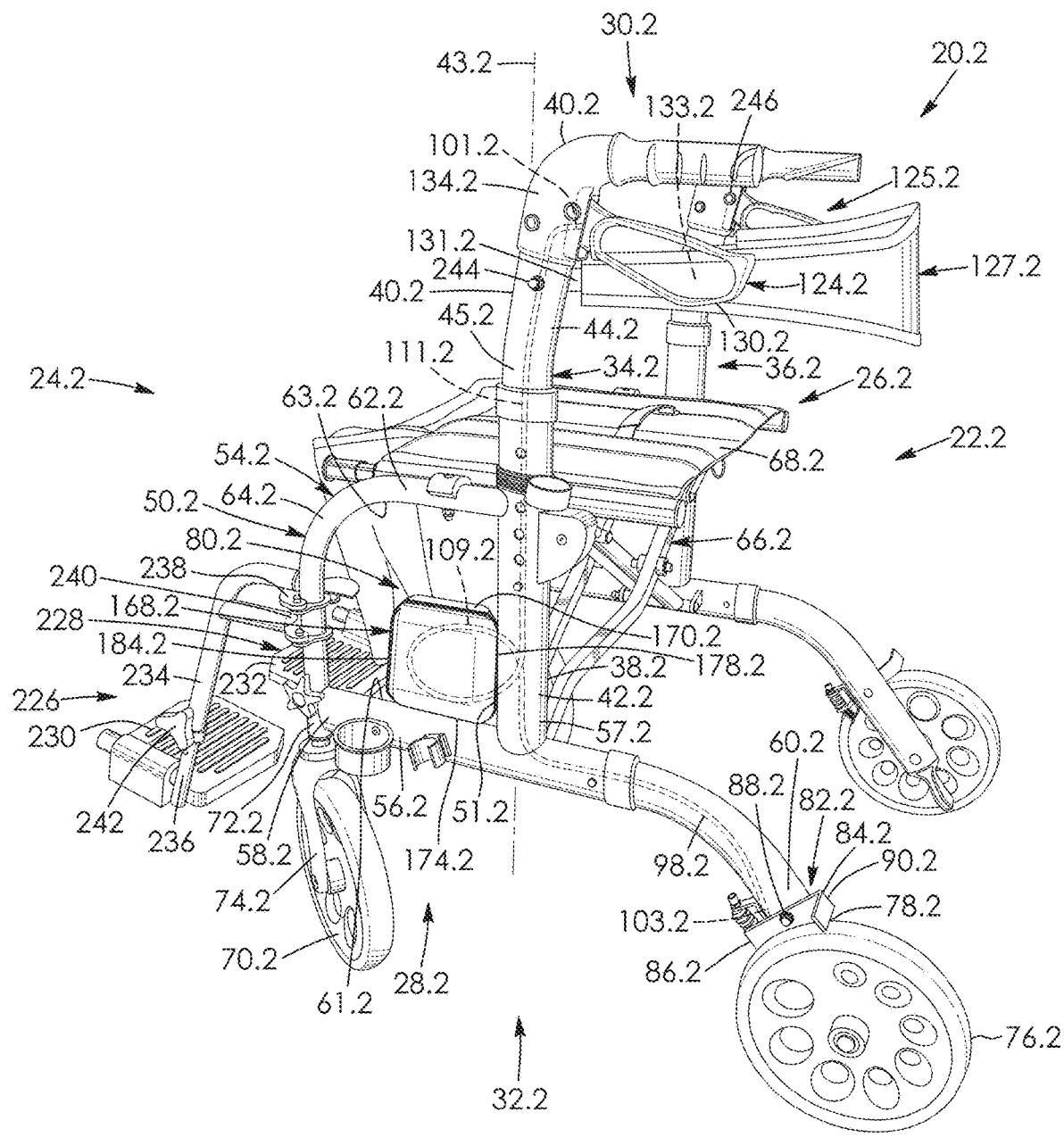
FIG. 18 is a rear, right side perspective view of a patient transport apparatus according to a third aspect, the patient transport apparatus comprising a combination transport chair and walker apparatus, the combination transport chair and walker apparatus including a backrest shown in a transport-chair-mode position and a brake assembly with a pair of spaced-apart brake cable housings.
Figure 19:
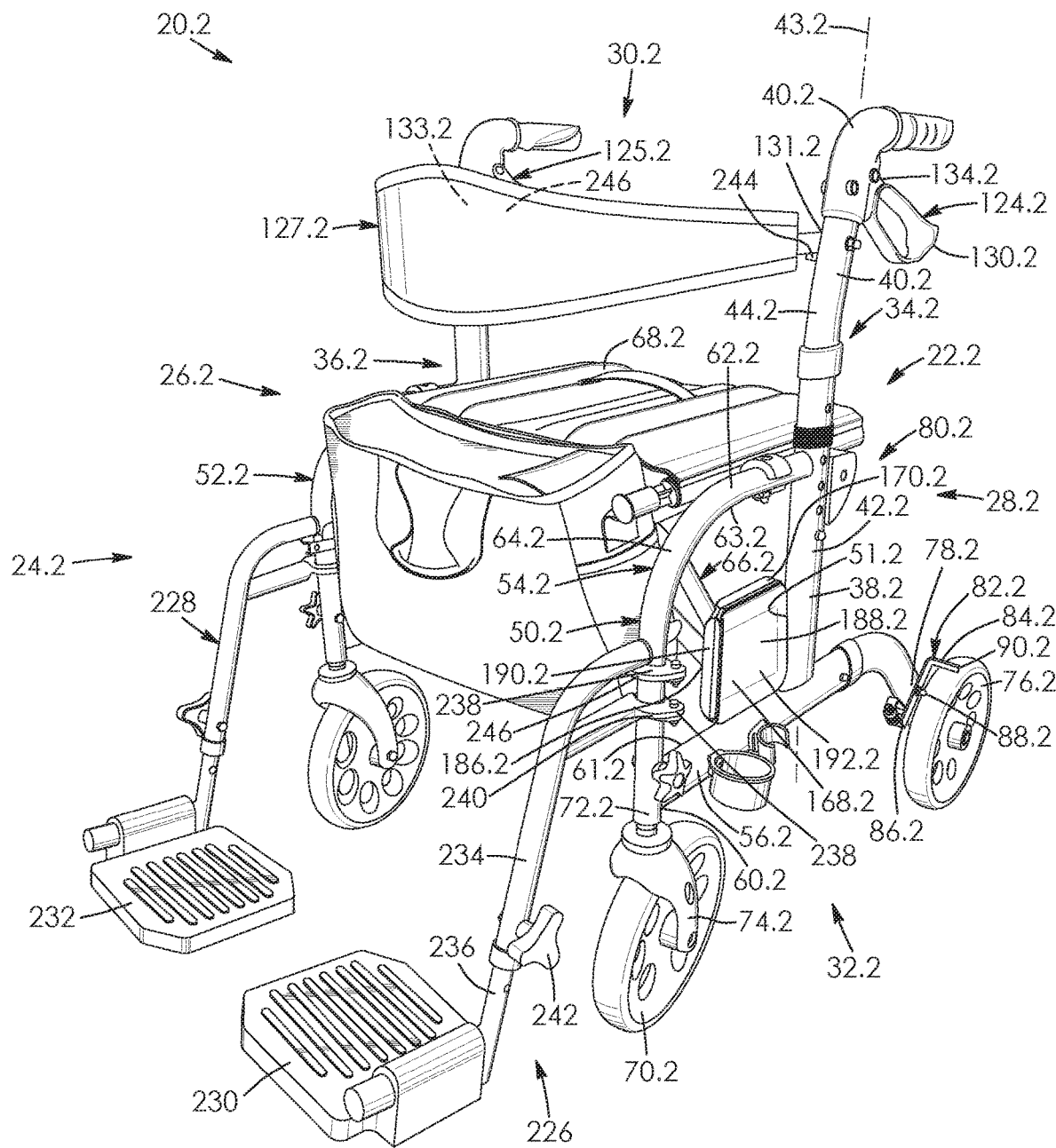
FIG. 19 is a front, right side perspective view of the combination transport chair and walker apparatus of FIG. 18, with the backrest shown in a walker-mode position.

FIGS. 18 to 19 show a height-adjustable patient transport apparatus according to a third aspect, in this example a combination transport chair and walker apparatus 20.2. Like parts have like numbers and functions as the apparatus 20 shown in FIGS. 1 to 16 with the addition of decimal extension ".2". Apparatus 20.2 is substantially the same as apparatus 20 shown in FIGS. 1 to 16 with the following exceptions.

As seen in FIGS. 18 and 19, the apparatus 20.2 includes a pair of foot rest assemblies 226 and 228. The foot rest assemblies include foot rests 230 and 232 that are positioned along the front 24.2 and bottom 32.2 of the apparatus, with foot rest 230 being adjacent to side 28.2 and foot rest being adjacent to side 26.2. The foot rests are planar and rectangular in shape in this example and are shaped to receive respective feet of a person who is sitting on seat assembly 68.2 while sitting facing the front of the apparatus 20.2.

Referring to FIG. 18, each of the foot rest assemblies 226 and 228 includes length-adjustable framing, in this example in the form of telescoping tubes 234 and 236. Outer tube 234 selectively couples to its respective laterally-extending assembly 50.2 via a coupling mechanism, in this example clamps 238 and 240 that extend about curved portion 64.2 of tube 54.2. Inner tube 236 couples to foot rest 230 and is received in part within the outer tube. Each of the foot rest assemblies 226 and 228 includes an adjustable mechanism, in this example a thumb screw 242. Loosening of the thumb screw enables inner tube 236 to be rotatable relative to outer tube 234 and enables the extent to which the inner tube extends outwards from the outer tube to be adjustable. When a desired length of tubing and angular position of the foot rests 230 is obtained, the thumb screw 242 is tightened to couple the inner and outer tubes together.

The apparatus 20.2 has a transportation chair mode seen in FIG. 18 in which backrest 127.2 is in a transport-chair-mode position. The backrest in this position extends between its ends 131.2 and 133.2 towards and adjacent to the rear 22.2 of the apparatus.

As seen in FIG. 19, the backrest 127.2 includes a pair of adjustment mechanisms 244 and 246 adjacent to the ends 131.2 and 133.2 thereof. The thumb screws when loosened enable the backrest to move from the transport-chair-mode position seen in FIG. 18, to a walker-mode position seen in FIG. 19. The backrest 127.2 in this position extends from its ends 131.2 and 133.2 towards the front 24.2 of the apparatus 20.2. When the desired backrest position is achieved, the thumb screws are tightened to inhibit rotation of the backrest relative to the upright assemblies 34.2 and 36.2 thereafter. Apparatus 20.2 thus can be a transportation chair at times and a walker apparatus at times. Thus, the apparatus can be configured as a transport chair or walker apparatus.

Referring to FIG. 18, lower side frame member, in this example tube 56.2 is J-shaped and has wheels 70.2 and 76.2 operatively connected thereto at distal ends 58.2 and 60.2 thereof. Upright assemblies 34.2 and 36.2 are positioned between the front 24.2 and the rear 22.2 of the apparatus 20.2 in this example. Tube 42.2 couples and extends upwards from tube 56.2. Tubes 42.2, 44.2 and 56.2 are similar in diameter in this example, with tubes 54.2 being smaller in diameter compared thereto.

As seen in FIG. 18, bottom 174.2 of brake cable housing 168.2 couples to and abuts top 61.2 of frame member 56.2 in this example. Elongate rear 178.2 of the brake cable housing couples to and abuts the outer tube 42.2 adjacent to frame member 56.2 in this case. Substantially straight portion 62.2 of tube 54.2 is spaced-apart above of the brake cable housing 168.2 in this example and curved portion 64.2 of the tube is positioned forward of the brake cable housing.

Figure 20:
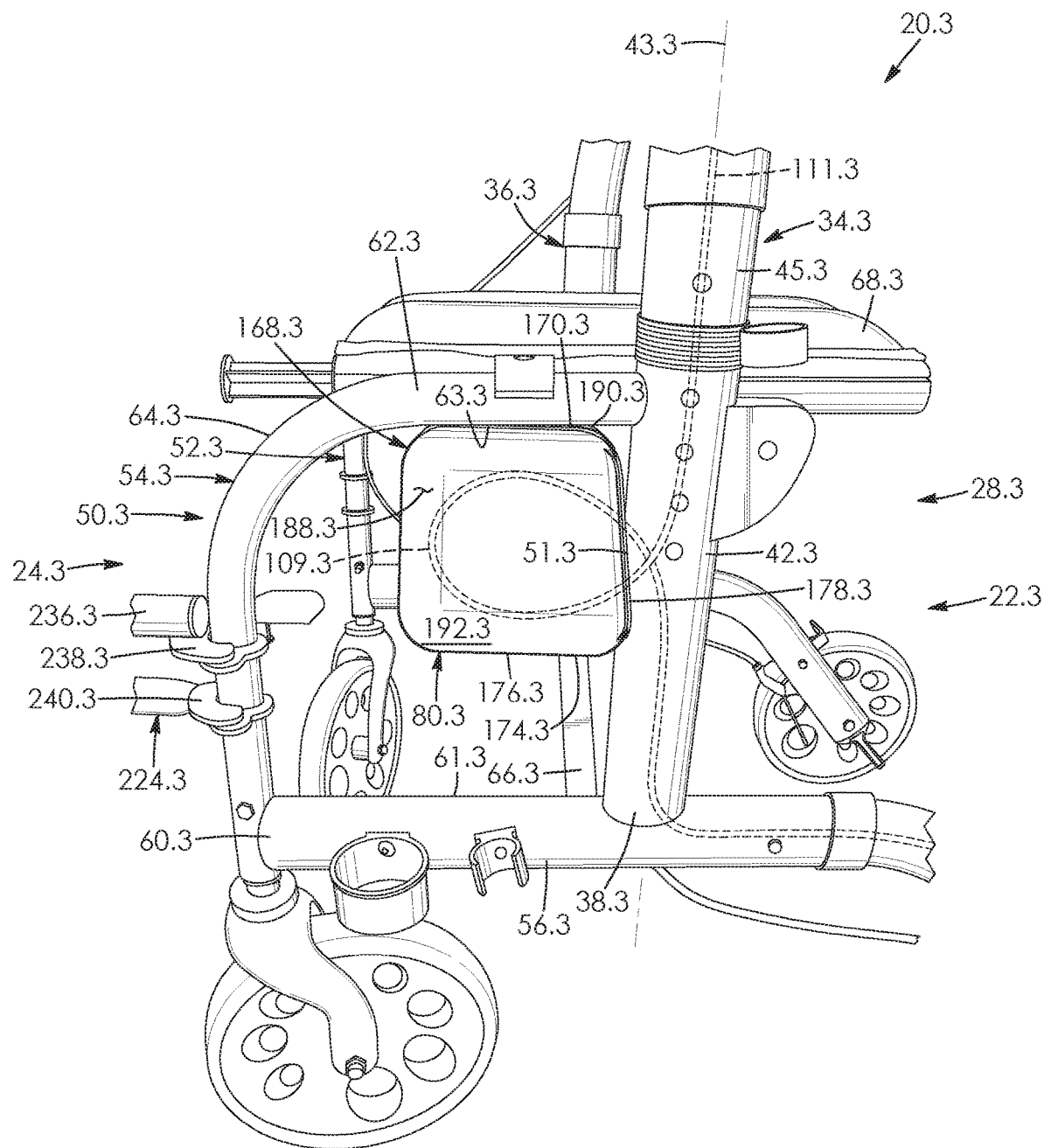
FIG. 20 is an enlarged right side perspective view of a patient transport apparatus according to a fourth aspect, the patient transport apparatus comprising a combination transport chair and walker apparatus shown in fragment, the combination transport chair and walker apparatus including a laterally-extending assembly and a brake assembly comprising a pair of brake cable housings.
Figure 21:
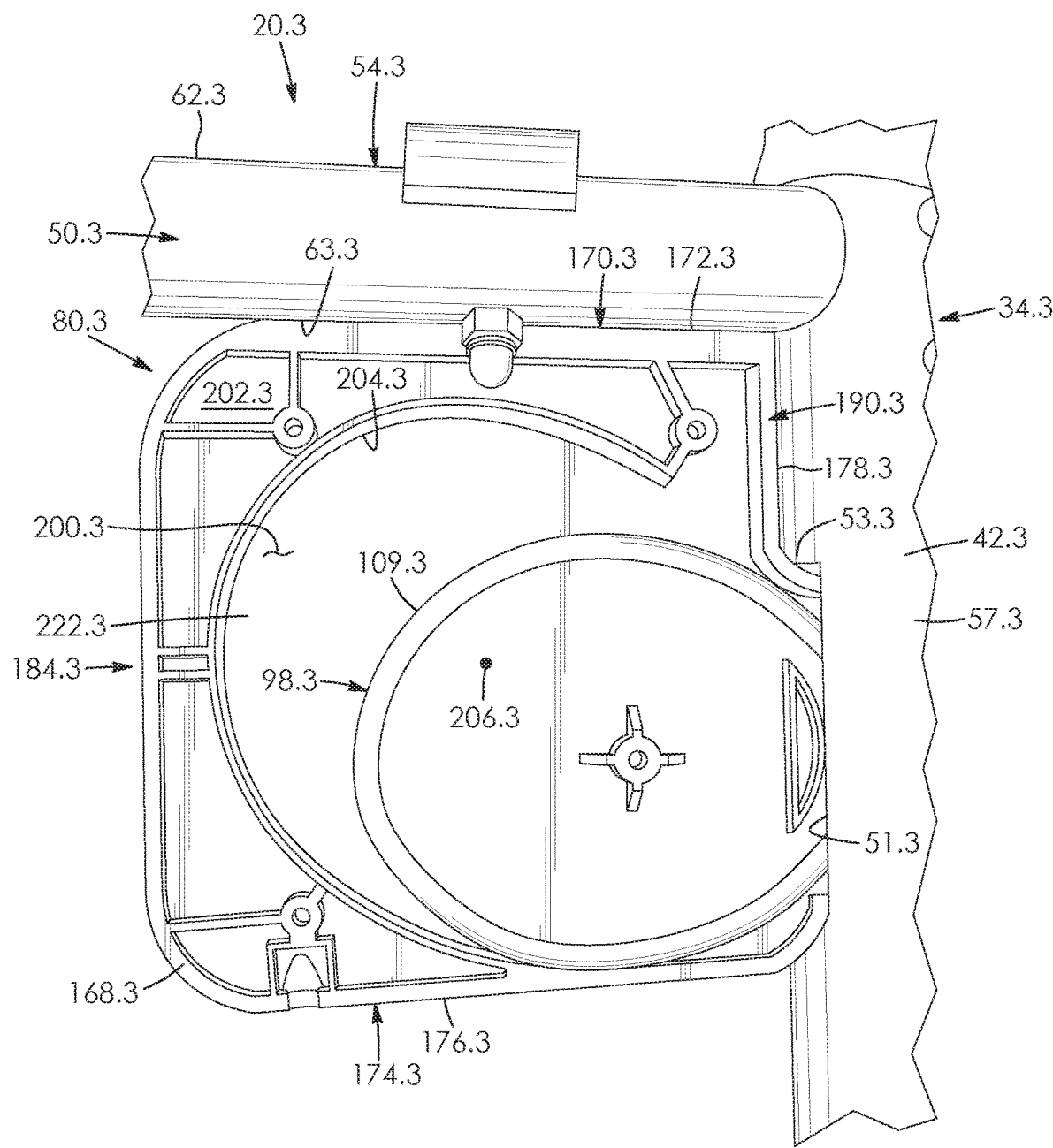
FIG. 21 is an enlarged, fragmented view of the laterally-extending assembly and brake cable housing of FIG. 20, with one of the half sections of the housing being removed to reveal the interior of the housing and a brake cable assembly of the brake assembly.

FIGS. 20 to 21 show a height-adjustable patient transport apparatus according to a fourth aspect, in this example a combination transport chair and walker apparatus 20.3. Like parts have like numbers and functions as the apparatus 20.2 shown in FIGS. 18 to 19 with decimal extension ".3" replacing decimal extension ".2" and being added for numbers not previously having decimal extensions. Apparatus 20.3 is substantially the same as apparatus 20.2 shown in FIGS. 18 to 19 with the following exceptions.

As seen in FIG. 20, top 170.3 of brake cable housing 168.3 couples to and abuts bottom 63.3 of an upper side frame member, in this example substantially-straight portion 62.3 of upper tube 54.3. Elongate rear 178.3 of the brake cable housing couples to and abuts the upright assembly 34.3 in this case. Lower side frame member 56.3 is spaced-apart below of the brake cable housing 168.3 in this example and curved portion 64.3 of tube 54.3 is positioned forward of the brake cable housing.

As seen in FIG. 21, brake cable housing 168.3 is generally c-shaped in cross section. The chamber 222.3 is generally oval-shaped or tear-dropped and the housing thus does not include the inner portion 208, upper passageway 214 or lower passageway 218 seen in FIG. 14 for apparatus 20 in this example.

Figure 22:
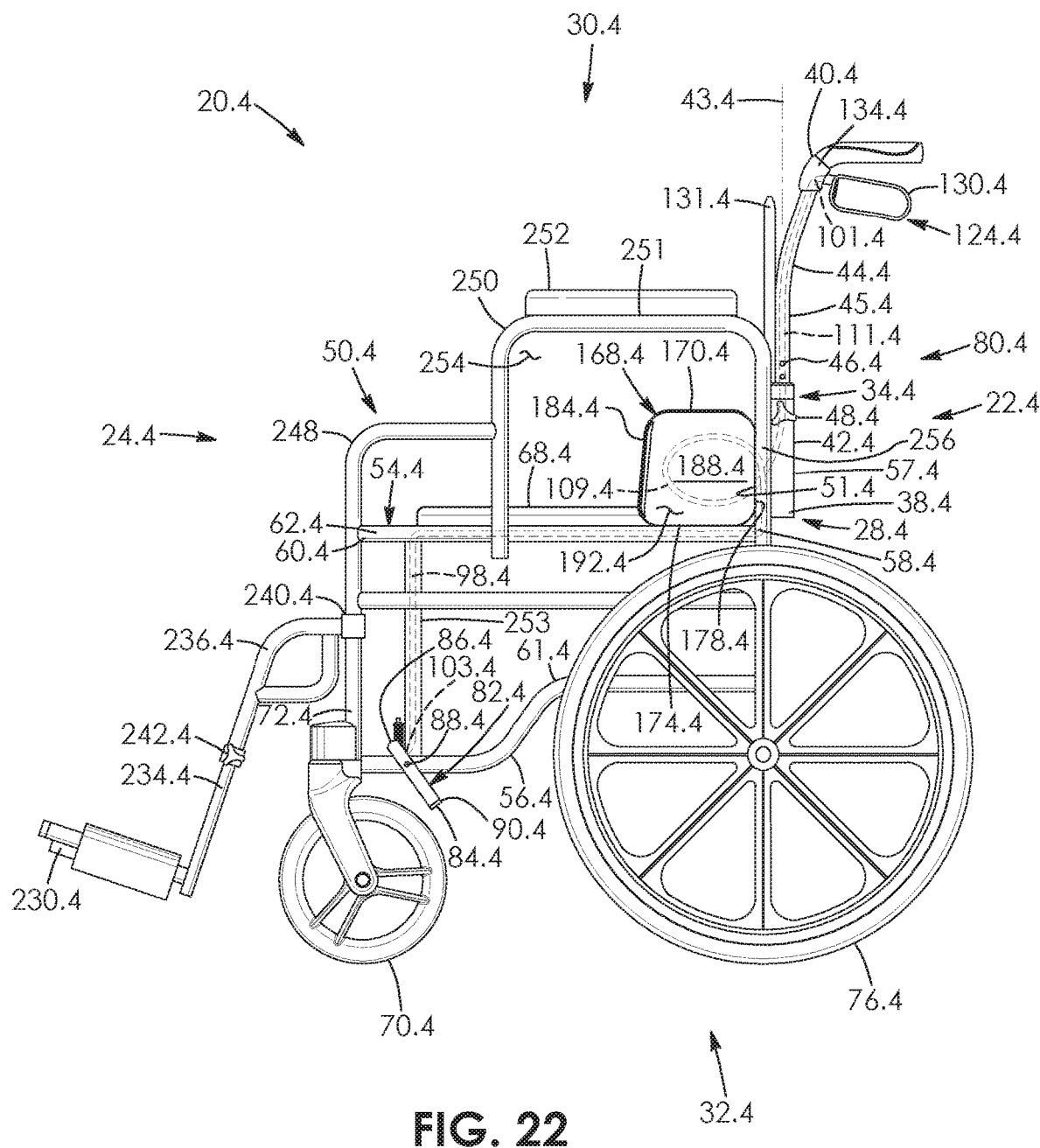
FIG. 22 is a right side elevation view of a patient transport apparatus according to a fifth aspect, the patient transport apparatus comprising a wheelchair.

FIG. 22 shows a height-adjustable patient transport apparatus according to a fifth aspect, in this example a wheelchair 20.4. Like parts have like numbers and functions as the apparatus 20.2 shown in FIGS. 18 to 19 with decimal extension ".4" replacing decimal extension ".2" and being added for numbers not previously having decimal extensions. Wheelchair 20.4 is substantially the same as apparatus 20.2 shown in FIGS. 18 to 19 with the following exceptions.

The wheelchair has a pair of spaced-apart front wheels 70.4 and a pair of spaced-apart, enlarged, hand-propelled rear wheel 76.4. The wheelchair 20.4 includes a pair of spaced-apart height-adjustable assemblies 34.4 to which corresponding gripping handles 130.4 couple at upper ends 40.4 of the height-adjustable assemblies.

The wheelchair 20.4 includes various u-shaped frames 248 and 250 per laterally-extending assembly 50.4 in this example. Armrests 252 couple to and extend along the tops 251 of respective ones of frames 250. The frames 248 and 250 couple to and extend upwards from tube 54.4 in this example. The wheelchair 20.4 includes brake assemblies 80.4, with a brake cable housing 168.4 per side thereof. Each brake cable housing is position within the square-shaped opening 254 formed by corresponding frame 250 and tube 54.4 in this example. Bottom 174.4 of the brake cable housing 168.4 couples to tube 54.4 and rear 178.4 of the brake cable housing couples to upright portion 256 of frame 250 in this example.

The wheelchair includes an upright backrest 131.4 which couples to the upright portion of frame 250 in this example. Tubes 42.4 of the height-adjustable assemblies 34.4 also couple to frame 250 in this example.

The wheelchair 20.4 includes a vertically-extending hollow frame member, in this example tube 253 per side thereof, with the frame member extending between tube 54.4 and rod 56.4 in this example.

Bowden cable 98.4 is positioned within the framing of the wheelchair 20.4, in this example within tubes 44.4, 42.4, 54.4, and 253, with slack portion 109.4 of the Bowden cable being enclosed within the brake cable housing 168.4 in a like manner as described previously. The brake cable housing is shaped to accommodate varying amounts of excess portions of the cable as the vertical positioning of the gripping handles 130.4 is adjusted by the user as needed. Actuation of the gripping handle causes the cable 98.4 to move spring-biased brake pad 90.4 so as to selectively engage and brake front wheel 70.4. This functions to inhibit movement of the wheelchair 20.4 in a like manner as previous described above. The brake pads 90.4 pivotally couple to rods 56.4 adjacent to the front wheels in this example.

Figure 23:
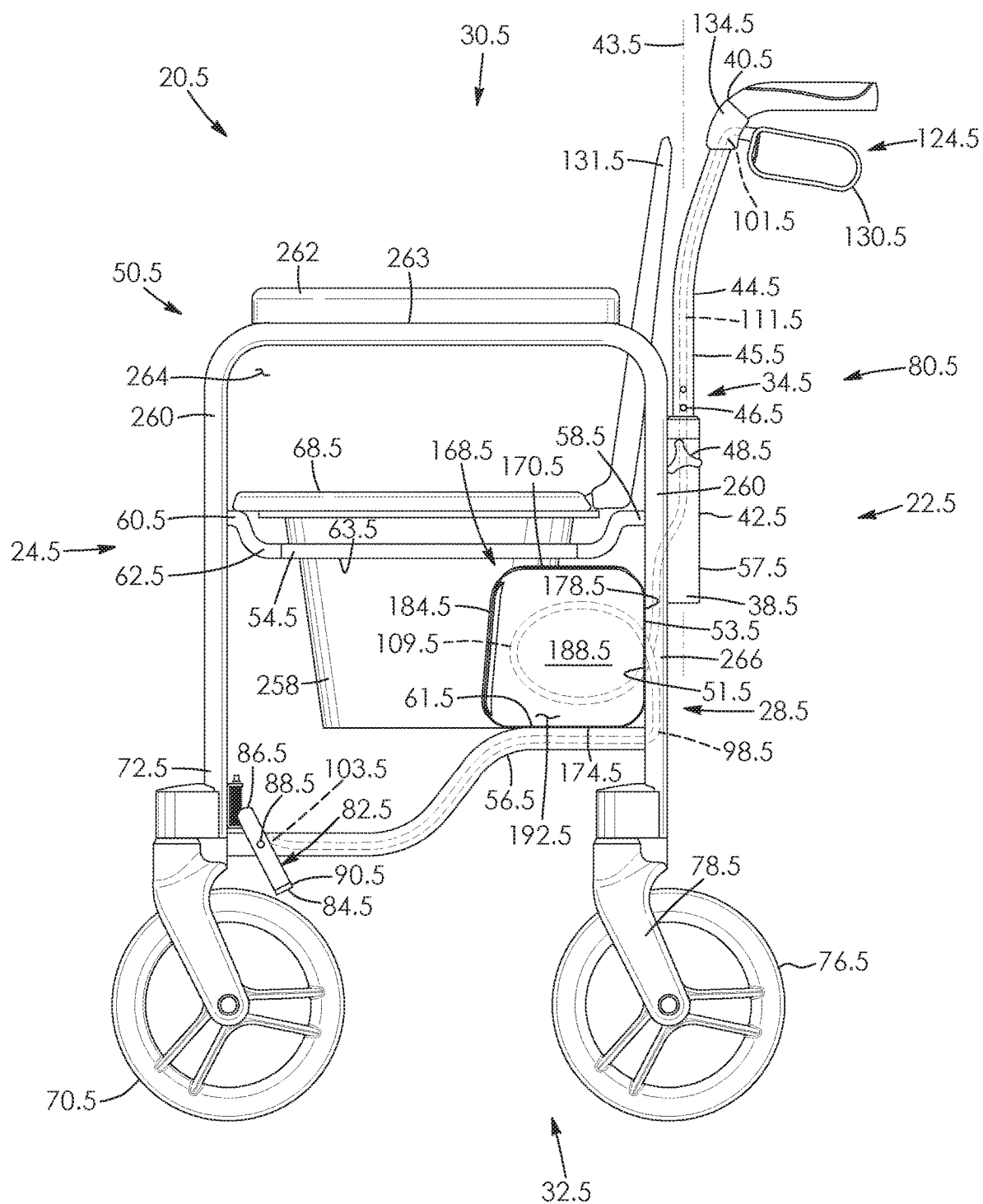
FIG. 23 is a right side elevation view of a patient transport apparatus according to a sixth aspect, the patient transport apparatus comprising a commode with wheels.

FIG. 23 shows a height-adjustable patient transport apparatus according to a sixth aspect, in this example a wheeled commode 20.5. Like parts have like numbers and functions as the apparatus 20.2 shown in FIGS. 18 to 19 with decimal extension ".5" replacing decimal extension ".2" and being added for numbers not previously having decimal extensions. Commode 20.5 is substantially the same as apparatus 20.2 shown in FIGS. 18 to 19 with the following exceptions.

The commode has a pair of spaced-apart front wheels 70.5 and a pair of spaced-apart rear wheel 76.5. The commode includes a pair of spaced-apart height-adjustable upright assemblies 34.5 to which gripping handles 130.5 couple at upper ends 40.5 of the height-adjustable assemblies.

The commode 20.5 includes a chamber pot 258 which couples to and extends downwards from seat 68.5 thereof. The commode includes an upright backrest 131.5 which couples to and extends upwards from the seat.

The commode 20.5 includes a u-shaped frame 260 per laterally-extending assembly 50.5 in this example. Armrests 262 couple to and extend along the top 263 of respective ones of the frames. Each frame 260 couples to and extends upwards from a respective rod 56.5. Tube 54.5 is positioned between the rod and top 263 of the frame in this example and couples to and extends between the frame.

The commode 20.5 includes brake assemblies 80.5 to selectively brake wheels 70.5 in this example. Each brake assembly includes a brake cable housing 168.5 positioned within the opening 264 formed by frame 260 and tube 54.5 in this example. Bottom 174.5 of the brake cable housing couples to the top 61.5 of rod 56.5 in this example. Rear 178.5 of the brake cable housing 168.5 couples to upright portion 266 of frame 260 in this example. Tubes 42.5 of the height-adjustable upright assemblies 34.5 couple to the upright portions 266 of frames 260 in this example.

Bowden cable 98.5 is positioned within the framing of the commode 20.5, in this example extending within tubes 44.5 and 42.5 and rod 56.5. Slack portion 109.5 of the cable is enclosed within the brake cable housing 168.5 in a like manner as described previously. The brake cable housing is shaped to accommodate varying amounts of excess portions of the cable as the vertical positioning of the gripping handles 130.5 is adjusted by the user as needed. Actuation of gripping handle 130.5 causes the cable 98.5 to move the spring-biased brake pad 90.5 to selectively engage and brake front wheel 70.5. This functions to inhibit movement of the commode in a like manner as previous described above. The brake pads pivotally couple to rods 56.5 adjacent to the front wheels 70.5 in this example.

Figure 24:
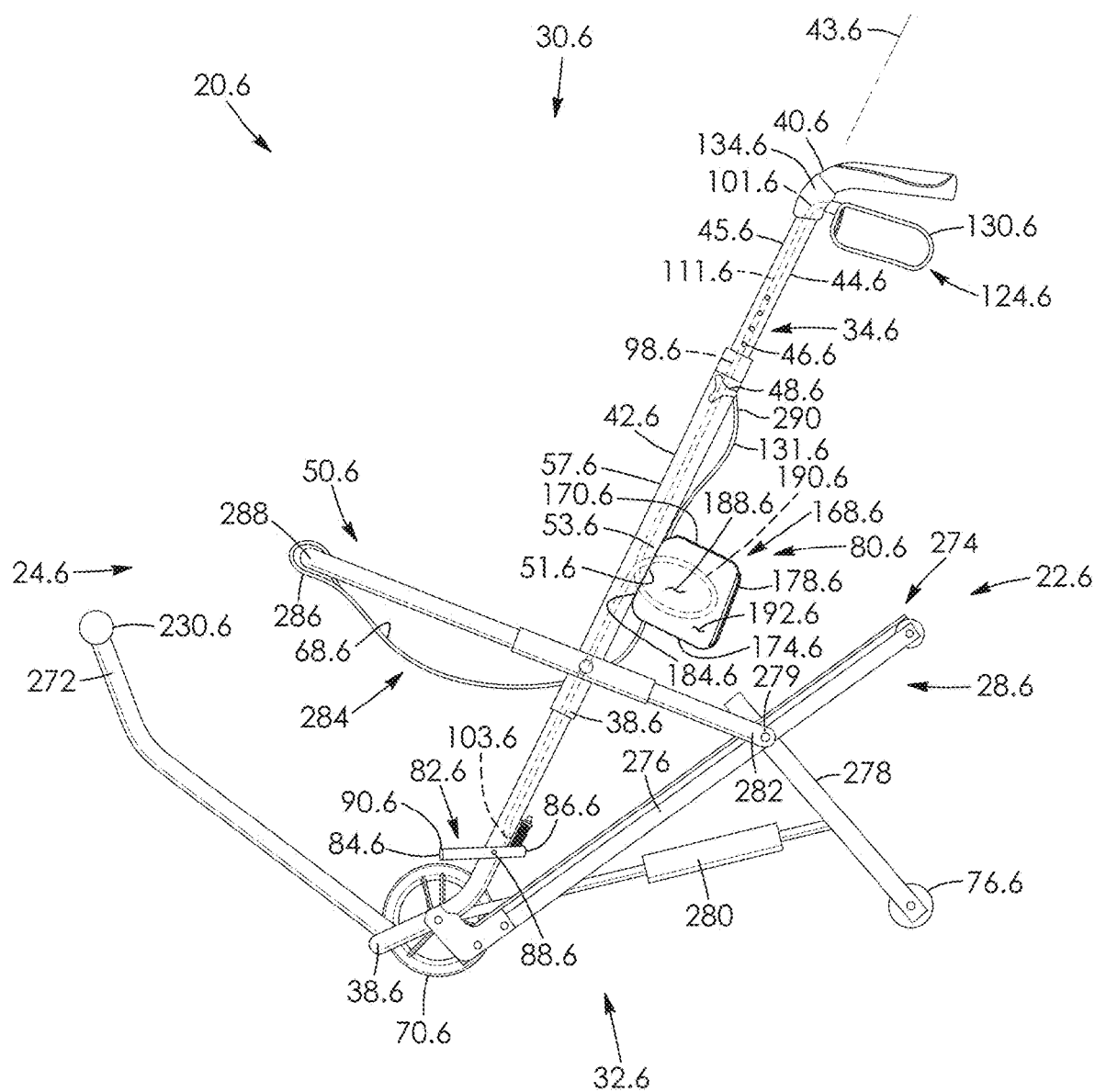
FIG. 24 is a right side elevation view of a patient transport apparatus according to a seventh aspect, the patient transport apparatus comprising an evacuation chair.

FIG. 24 shows a height-adjustable patient transport apparatus according to a seventh aspect, in this example an evacuation chair 20.6. Like parts have like numbers and functions as the apparatus 20.2 shown in FIGS. 18 to 19 with decimal extension ".6" replacing decimal extension ".2" and being added for numbers not previously having decimal extensions. Evacuation chair 20.6 is substantially the same as apparatus 20.2 shown in FIGS. 18 to 19 with the following exceptions.

The evacuation chair includes a pair of spaced-apart front wheels 70.6 and a pair of spaced-apart rear wheel 76.6. The evacuation chair 20.6 includes a pair of height/length-adjustable assemblies at adjacent sides thereof and to which respective laterally-extending assemblies pivotally connect. This is shown by height-adjustable upright assembly 34.6 pivotally connecting with laterally-extending assembly 50.6 between the lower end 38.6 and upper end 40.6 thereof. Front wheels 70.6 are rotatably mounted to the height-adjustable assemblies upright 34.6 adjacent to the lower ends thereof.

A foot-support, in this example in the form of u-shaped frame 272 pivotally couples to and is extendable outwards from lower ends 38.6 of the height-adjustable assemblies upright 34.6.

The evacuation chair 20.6 includes a pair of wheel folding assemblies 274 per side thereof. Each folding assembly includes a pair of base frame members 276 and 278 that pivotally couple together via axle 279. Base frame member 276 pivotally couples to front wheel 70.6. Rear wheels 76.6 rotatably mount to base frame members 278. Each folding assembly includes in this example a hydraulic actuator 280 that pivotally connects to and couples together base frame member 278 and front wheel 70.6. Rear end 282 of laterally-extending assembly 50.6 pivotally couples to axle 279 in this example. The folding mechanisms, foot support, height-adjustable assemblies and laterally-extending assemblies of the evacuation chair 20.6 are configured to selectively fold upon themselves to form a compact form when the evacuation chair is not needed. Evacuation chairs per se, including their various parts and functionings, are well known to those skilled in the art and details regarding folding mechanisms in this regard will thus not be described in further detail.

The evacuation chair 20.6 includes a flexible member 284 with a bottom portion in the form of a seat 68.6 and an upright portion in the form of backrest 131.6. The flexible member extends between the sides 28.6 of the evacuation chair with a lower end 286 mounted to distal ends 288 of the laterally-extending assemblies 50.6. An upper end 290 of the flexible member 286 couples to the upright assemblies 34.6 at a location adjacent to the thumb screw 48.6 in this example.

The evacuation chair 20.6 includes brake assemblies 80.6 which include spring-biased brake pads 90.6. The brake pads are mounted to the height-adjustable upright assemblies 34.6 adjacent to the front wheels 70.6 of the evacuation chair. The brake assemblies 80.6 include a brake cable housing 168.6 per side thereof. The front 184.6 of each brake cable housing couples to and extends along a respective tube 42.6 of its corresponding upright assembly 34.6 in this example.

Bowden cable 98.6 is positioned within the framing of the evacuation chair 20.6, in this example within tubes 44.6 and 42.6, with slack portion 109.6 of the Bowden cable being enclosed within the brake cable housing 168.6 in a like manner as described previously. The brake cable housing is shaped to accommodate varying amounts of excess portions of the cable as the positioning of the gripping handles 130.6 is adjusted by the user as needed. Actuation of the gripping handle causes the cable 98.6 to move spring-biased brake pad 90.6 so as to selectively engage and brake front wheel 70.6. This functions to inhibit movement of the evacuation chair 20.6 in a like manner as previous described above. The brake pads 90.6 pivotally couple to the upright assembly 34.6 adjacent to the front wheels 70.6 in this example.

Figure 25:
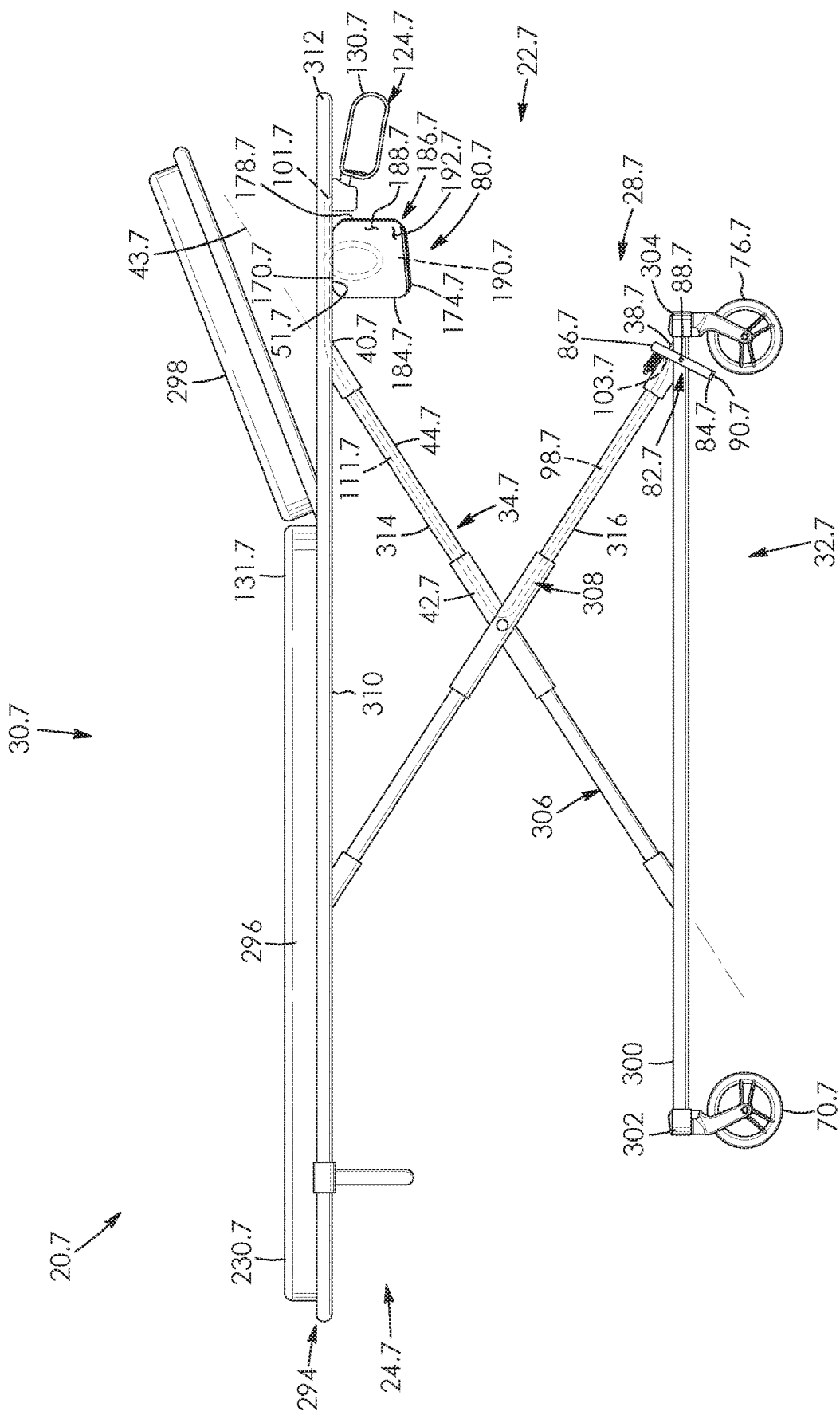
FIG. 25 is a right side elevation view of a patient transport apparatus according to an eighth aspect, the patient transport apparatus comprising a height-adjustable stretcher.

FIG. 25 shows a height-adjustable patient transport apparatus according to an eighth aspect, in this example a height-adjustable stretcher 20.7. Like parts have like numbers and functions as the apparatus 20.2 shown in FIGS. 18 to 19 with decimal extension ".7" replacing decimal extension ".2" and being added for numbers not previously having decimal extensions. Stretcher 20.7 is substantially the same as apparatus 20.2 shown in FIGS. 18 to 19 with the following exceptions.

The stretcher includes a horizontally-extending upper platform 294 upon a body mattress 296 and head cushion 298 couple and extend in this example. The stretcher 20.7 includes a base, in this example a base frame assembly 300 to which front wheels 70.7 rotatably mount at a forward end 302 thereof and to which rear wheels 76.7 mount at a rearward end 304 thereof.

The stretcher includes a height-adjustment mechanism 34.7 which in this example comprises a pair of crossed-linking telescoping assemblies 306 and 308 that are hollow in this example. The telescoping assemblies pivotally couple to and extend between platform 294 and base frame assembly 300. Height-adjustment mechanisms for stretchers, including their various parts and functionings, are known per se and thus will not be described in further detail.

The stretcher 20.7 includes a pair of gripping handles 130.7 that couple to the bottom 310 of platform 294 in this example adjacent to the rearward end 312 of the platform.

The stretcher 20.7 includes brake assemblies 80.7 to selectively brake wheels 76.7 in this example. Each brake assembly includes a brake cable housing 168.7. In this example the top 170.7 of each brake cable housing couples to and extends along the bottom 310 of the platform 294 adjacent to the rearward end 312 of the platform.

Bowden cable 98.7 is positioned within the framing of the stretcher 20.7, in this example extending within platform 294, rearward tubing 314 telescoping assembly 306 and rearward tubing 316 of telescoping assembly 308. Slack portion 109.7 of the cable is enclosed within the brake cable housing 168.7 in a like manner as described previously. The brake cable housing is shaped to accommodate varying amounts of excess portions of the cable as the height of the stretcher is adjusted as needed. Actuation of gripping handle 130.7 causes the cable 98.7 to move the spring-biased brake pad 90.7 to selectively engage and brake rear wheels 70.7. This functions to inhibit movement of the stretcher in a like manner as previous described above. The brake pads 90.7 pivotally couple to the base frame assembly 300 adjacent to the rear wheels 76.7 in this example.

It will be appreciated that many variations are possible within the scope of the invention described herein. It will also be understood by someone skilled in the art that many of the details provided above are by way of example only and are not intended to limit the scope of the invention which is to be determined with reference to at least the following claims.

What is claimed is:

1. A patient transport apparatus, comprising:
a height-adjustable assembly having a longitudinal axis;
a side frame member coupled to the height-adjustable assembly, the side frame member extending outwardly from the height-adjustable assembly relative to the longitudinal axis of the height-adjustable assembly;
a brake cable having an elongate portion extending along the height-adjustable assembly and having a slack portion; and
a brake cable housing coupled to and axially offset from the height-adjustable assembly and coupled to and abutting the side frame member, the slack portion of the brake cable being enclosed within a hollow interior of the brake cable housing.

2. The patient transport apparatus as claimed in claim 1, wherein the brake cable is a bowden cable.

3. The patient transport apparatus as claimed in claim 1, wherein the height-adjustable assembly comprises an inner tube telescopically received within an outer tube.

4. The patient transport apparatus as claimed in claim 3, wherein the brake cable housing is coupled to one of the inner and outer tubes.

5. The patient transport apparatus as claimed in claim 3, wherein one of the tubes has an aperture extending therethrough, the slack portion of the brake cable extending through the aperture, and wherein the brake cable housing is in communication with the one of the inner and outer tubes via the aperture.

6. The patient transport apparatus as claimed in claim 1, further comprising at least one gripping handle coupled to the height-adjustable assembly, wherein the height-adjustable assembly enables the gripping handle to move from a retracted position to an extended position, and wherein the slack portion of the brake cable is loop-shaped and enlarged when the gripping handle is in the retracted position.

7. The patient transport apparatus as claimed in claim 1, further comprising at least one gripping handle coupled to the height-adjustable assembly, wherein the height-adjustable assembly enables the gripping handle to move from a retracted position to an extended position, and wherein the slack portion of the brake cable abuts an inner wall of the brake cable housing when the gripping handle is in the retracted position.

8. The patient transport apparatus as claimed in claim 1, wherein the brake cable housing has an inner wall that is inwardly concave.

9. The patient transport apparatus as claimed in claim 1, wherein the brake cable housing has an inner wall that is tear-drop shaped.

10. The patient transport apparatus as claimed in claim 1, wherein the brake cable housing is rectangular.

11. The patient transport apparatus as claimed in claim 1, wherein the side frame member and at least one additional frame member extend about and protect the brake cable housing.

12. The patient transport apparatus as claimed in claim 1, wherein the apparatus is a transportation chair.

13. The patient transport apparatus as claimed in claim 1, wherein the apparatus is a walker apparatus.

14. The patient transport apparatus as claimed in claim 1, wherein the apparatus comprises one of a walker apparatus, a transportation chair, a combination transportation chair and walker apparatus, a wheelchair, a wheeled commode, an evacuation chair and a stretcher.

15. The patient transport apparatus as claimed in claim 1, wherein the brake cable housing is generally c-shaped in cross section.

16. The patient transport apparatus as claimed in claim 1, wherein the elongate portion of the brake cable extends parallel with the longitudinal axis of the height-adjustable assembly and wherein the slack portion of the brake cable extends laterally outwards from the height-adjustable assembly relative to the longitudinal axis of the height-adjustable assembly.

17. The patient transport apparatus as claimed in claim 1, wherein the brake cable housing has a rear through which excess portions of the brake cable enter and exit, wherein the brake cable forms an enlarged loop shape within the brake cable housing when the height adjustable assembly is in a retracted position, and wherein the brake cable forms a reduced loop shape spanning a planar area that is less than that of the enlarged loop shape when the height adjustable assembly is in an extended position.

18. The patient transport apparatus as claimed in claim 1, wherein the slack portion of the brake cable includes a loop.

19. A patient transport apparatus, comprising:
a height-adjustable assembly having a longitudinal axis;
a side frame member coupled to the height-adjustable assembly, the side frame member extending outwards from the height-adjustable assembly relative to the longitudinal axis of the height-adjustable assembly, the side frame member having a bottom;
a brake cable having an elongate portion extending along the height-adjustable assembly and having a slack portion; and
a brake cable housing axially offset from the height-adjustable assembly, the brake cable housing having an elongate rear coupled to and abutting the height-adjustable assembly and an elongate top coupled to and abutting the bottom of the side frame member;
the slack portion of the brake cable being enclosed within a hollow interior of the brake cable housing.

20. A patient transport apparatus, comprising:
a height-adjustable assembly having a longitudinal axis;
a side frame member coupled to the height-adjustable assembly, the side frame member extending outwards from the height-adjustable assembly relative to the longitudinal axis of the height-adjustable assembly, the side frame member having a top;
a brake cable having an elongate portion extending along the height-adjustable assembly and having a slack portion; and
a brake cable housing axially offset from the height-adjustable assembly, the brake cable housing having an elongate rear coupled to and abutting the height-adjustable assembly and an elongate bottom coupled to and abutting the top of the side frame member;
the slack portion of the brake cable being enclosed within a hollow interior of the brake cable housing.

* * * * *